United States Patent
Aoki

(10) Patent No.: US 10,677,749 B2
(45) Date of Patent: *Jun. 9, 2020

(54) GAS DETECTION DEVICE

(71) Applicant: Toyota Jidosha Kabushiki Kaisha, Toyota-shi, Aichi-ken (JP)

(72) Inventor: Keiichiro Aoki, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 99 days.

This patent is subject to a terminal disclaimer.

(21) Appl. No.: 15/887,189

(22) Filed: Feb. 2, 2018

(65) Prior Publication Data

US 2018/0231492 A1 Aug. 16, 2018

(30) Foreign Application Priority Data

Feb. 13, 2017 (JP) .................................. 2017-023968

(51) Int. Cl.
| | |
|---|---|
| *G01N 27/406* | (2006.01) |
| *G01N 27/407* | (2006.01) |
| *F02D 41/14* | (2006.01) |
| *F02D 41/28* | (2006.01) |
| *F02D 41/20* | (2006.01) |

(Continued)

(52) U.S. Cl.
CPC ......... *G01N 27/4067* (2013.01); *F01N 3/021* (2013.01); *F01N 3/103* (2013.01); *F02D 41/1439* (2013.01); *F02D 41/1444* (2013.01); *F02D 41/1454* (2013.01); *F02D 41/1494* (2013.01); *G01N 27/4075* (2013.01); *F01N 13/008* (2013.01); *F01N 2560/025* (2013.01); *F01N 2560/027* (2013.01); *F01N 2560/20* (2013.01); *F02D 2041/2051* (2013.01); *F02D 2041/281* (2013.01); *G01N 27/4074* (2013.01); *Y02T 10/20* (2013.01)

(58) Field of Classification Search
CPC ..................... G01N 27/4074; F01N 2560/027
See application file for complete search history.

(56) References Cited

U.S. PATENT DOCUMENTS

| | | | |
|---|---|---|---|
| 8,393,316 B2 | 3/2013 | Kunihiro | |
| 2016/0146085 A1* | 5/2016 | Mizutani | ................. F01N 11/00 60/274 |
| 2018/0172624 A1* | 6/2018 | Aoki | .................. G01N 27/4074 |

FOREIGN PATENT DOCUMENTS

| | | | | |
|---|---|---|---|---|
| JP | 2015017931 | * | 1/2015 | ........... G01N 27/416 |
| JP | 2015017931 A | | 1/2015 | |

OTHER PUBLICATIONS

U.S. Appl. No. 15/796,219, filed Oct. 27, 2017; Inventors: Keiichiro Aoki et al.

(Continued)

*Primary Examiner* — Luan V Van
*Assistant Examiner* — Caitlyn Mingyun Sun
(74) *Attorney, Agent, or Firm* — Dinsmore & Shohl LLP

(57) ABSTRACT

A gas detection device includes a temperature control part configured to control an amount of energization to a heater so that an impedance of an element part matches a target impedance, to thereby control a temperature of the heater. The temperature control part is configured to set a first target impedance as the target impedance while performing application voltage control for air-fuel ratio detection, and set a second target impedance as the target impedance while performing application voltage control for SOx detection.

5 Claims, 16 Drawing Sheets

(51) Int. Cl.
*F01N 3/10* (2006.01)
*F01N 3/021* (2006.01)
*F01N 13/00* (2010.01)

(56) References Cited

OTHER PUBLICATIONS

Non-Final Office Action dated Jul. 18, 2019 in U.S. Appl. No. 15/892,851, filed Feb. 9, 2018.
Final Office Action dated Dec. 13, 2019 in U.S. Appl. No. 15/892,851, filed Feb. 9, 2018.
Notice of Allowance dated Apr. 1, 2020 in U.S. Appl. No. 15/892,851.

* cited by examiner

GAS DETECTION DEVICE

CROSS-REFERENCE TO RELATED APPLICATIONS

This application claims priority to Japanese Patent Application No. 2017-023968 filed on Feb. 13, 2017, the entire contents of which are hereby incorporated by reference.

BACKGROUND

1. Field

The present disclosure relates to a gas detection device capable of determining whether or not sulfur oxide having a concentration equal to or more than a predetermined concentration is contained in exhaust gas (gas to be detected) of an internal combustion engine or detecting a concentration of the sulfur oxide contained in the exhaust gas.

2. Description of the Related Art

Hitherto, there is widely used an air-fuel ratio sensor (also referred to as "A/F sensor") configured to acquire an air-fuel ratio (A/F) of mixture in a combustion chamber based on a concentration of oxygen ($O_2$) contained in exhaust gas in order to control an internal combustion engine. As one type of the air-fuel ratio sensor, a limiting current type gas sensor can be given.

Further, there is proposed a sulfur oxide (hereinafter sometimes referred to as "SOx") concentration detection device (hereinafter referred to as "related-art device") configured to detect a concentration of SOx in the exhaust gas through use of such a limiting current type gas sensor (see, for example, Japanese Patent Application Laid-open No. 2015-17931).

The related-art device includes a sensing cell (sometimes referred to as "electrochemical cell" or "element") using an oxygen pumping action of an oxygen ion conductive solid electrolyte. The related-art device is configured to apply a voltage between a pair of electrodes of the sensing cell to decompose gas components (for example, $O_2$, SOx, and $H_2O$, and hereinafter also referred to as "oxygen-containing components") containing oxygen atoms in the exhaust gas, to thereby generate oxide ions ($O^{2-}$). The related-art device is configured to detect a characteristic of a current flowing between the electrodes as a result of movement (oxygen pumping actin) of the oxide ions generated by the decomposition of the oxygen-containing components between the electrodes of the sensing cell.

More specifically, the related-art device is configured to perform an application voltage sweep when the SOx concentration is detected.

In other words, the related-art device is configured to perform the application voltage sweep of increasing an application voltage applied to the sensing cell from 0.4 V to 0.8 V and then decreasing the application voltage from 0.8 V to 0.4 V.

Then, the related-art device is configured to use a difference between a reference current, which is a "current (hereinafter sometimes referred to as "electrode current" or "output current") flowing between the electrodes of the sensing cell" when the application voltage reaches 0.8 V, and a peak value, which is the minimum value of the output current in a period in which the application voltage is being decreased from 0.8 V to 0.4 V, to calculate the SOx concentration.

However, the output current is highly liable to change also due to influence of the oxygen-containing components other than SOx contained in the exhaust gas. For example, a decomposition voltage of water ($H_2O$) is equal to or slightly more than a decomposition voltage of sulfur oxide. Further, the concentration of the water in the exhaust gas varies in accordance with, for example, the air-fuel ratio A/F of the mixture. Therefore, it is difficult to eliminate the influence of the decomposition of the water on the output current and detect the output current caused only by the decomposition of a SOx component.

Thus, there has been a demand for performing the application voltage sweep similarly to the related-art device to acquire an "output current change not influenced by the oxygen-containing components other than SOx but caused only by the SOx component", and using the acquired output current change to precisely perform determination of whether or not the sulfur oxide having a concentration equal to or more than a predetermined concentration exists in the exhaust gas or detection of the concentration of the sulfur oxide in the exhaust gas (sometimes referred to as "SOx concentration detection").

Further, when the gas sensor acquires such an output current change, the gas sensor is preferred to avoid a variation of the output current in accordance with an element temperature, thereby avoiding a decrease in detection precision. Therefore, the gas sensor needs to maintain the element temperature at a predetermined temperature (predetermined temperature equal to or more than a temperature at which oxide ion conductivity of a solid electrolyte of the element appears).

Therefore, the gas sensor is configured to use an element impedance to apply feedback control to an amount of energization to a heater configured to heat the element through use of such a characteristic that the element impedance changes in accordance with the element temperature, to thereby maintain the element temperature at a constant predetermined temperature.

However, when the gas sensor performs the application voltage sweep in order to acquire the "output current change not influenced by the oxygen-containing components other than SOx but caused only by the SOx component" when performing the SOx concentration detection, the application voltage is more than an application voltage used for detecting the air-fuel ratio A/F is detected. Thus, types of component reacting on the electrodes are different from types of component in a case of detecting the air-fuel ratio A/F. Therefore, when the application voltage sweep is performed, a resistance of an interface (electrode interface resistance) between an oxygen ion conductive solid electrolyte body and the electrode is different from an electrode interface resistance in a case where application voltage control is performed to detect the air-fuel ratio A/F. The application voltage control for detecting the air-fuel ratio A/F is control of maintaining the application voltage to a voltage selected from a limiting current region in which the output current is a limiting current of the oxygen.

As a result, when the SOx concentration detection is performed, the relationship between the element temperature and the element impedance corresponding to this element temperature is different from this relationship in the case of the detection of the air-fuel ratio A/F. In other words, the element impedance corresponding to an arbitrary element temperature in the case of the SOx concentration detection has a value different from the element impedance corresponding to this arbitrary element temperature in the case of the detection of the air-fuel ratio A/F.

As a result, when the SOx concentration detection is performed with a target impedance of the feedback control being set to the same value as that of the detection of the air-fuel ratio, the element temperature may not be maintained to a temperature appropriate for the SOx concentration detection. In this case, there is a high possibility that the precision of the SOx concentration detection may decrease, which is not preferred.

SUMMARY

The present disclosure has been made in order to solve the above-mentioned problem, and therefore has an object to provide a gas detection device (hereinafter also referred to as "detection device of one embodiment of the present disclosure") capable of precisely determining whether or not sulfur oxide having a concentration equal to or more than a predetermined concentration is contained in exhaust gas or detecting the concentration of the sulfur oxide.

A gas detection device of one embodiment of the present disclosure includes:

an element part (40), which is provided in an exhaust passage (12) of an internal combustion engine, the element part (40) including an electrochemical cell (41c) including a solid electrolyte body (41s) having oxide ion conductivity and a first electrode (41a) and a second electrode (41b) formed on respective surfaces of the solid electrolyte body, and a diffusion resistance body (61) made of a porous material through which exhaust gas flowing through the exhaust passage is allowed to pass, the element part (40) being configured so that the exhaust gas flowing through the exhaust passage reaches the first electrode through the diffusion resistance body;

an element impedance detection part (81, 91) configured to detect an impedance of the element part;

a heating part (71) configured to generate heat when a current is supplied, to thereby heat the element part;

a temperature control part (20) configured to control an amount of energization to the heating part based on the detected impedance of the element part (Step 1140 of FIG. 11), to thereby control a temperature of the element part;

a voltage application part (81) configured to apply a voltage between the first electrode and the second electrode;

a current detection part (91) configured to detect an output current (Im), which is a current flowing between the first electrode and the second electrode; and a measurement control part (20) configured to use the voltage application part to control an application voltage (Vm), which is the voltage applied between the first electrode and the second electrode, use the current detection part to acquire the output current, and perform one of determination of whether or not sulfur oxide having a concentration equal to or more than a predetermined concentration is contained in the exhaust gas and detection of the concentration of the sulfur oxide in the exhaust gas, in which:

the measurement control part is configured to:

use the voltage application part to perform application voltage control for air-fuel ratio detection of setting the application voltage to a voltage (Vaf) that brings the output current to a limiting current of oxygen, to thereby detect the air-fuel ratio (A/F) of mixture supplied to the internal combustion engine based on the output current acquired during a period in which the application voltage control for the air-fuel ratio detection is being performed (Step 1210 and Step 1230 of FIG. 12 of FIG. 16); and use the voltage application part to perform application voltage control for SOx detection of performing at least one cycle of an application voltage sweep of: performing a voltage increase sweep of increasing the application voltage from a first voltage selected from a first voltage range more than a lower limit voltage in a region of the limiting current and less than a decomposition start voltage of the sulfur oxide to a second voltage selected from a second voltage range more than the decomposition start voltage of the sulfur oxide; and then performing a voltage decrease sweep of decreasing the application voltage from the second voltage to the first voltage (Step 1245 of FIG. 12 and FIG. 16), to thereby acquire, based on the output current, a parameter (Id) correlating with a degree of a change, which is generated in the output current resulting from a current flowing between the first electrode and the second electrode due to a phenomenon that sulfur adsorbed to the first electrode returns to sulfur oxide through a reoxidation reaction on the first electrode when the application voltage becomes less than the decomposition start voltage of the sulfur oxide in a period of the voltage decrease sweep, and is generated in the output current that increases as the concentration of the sulfur oxide contained in the exhaust gas increases (Step 1320 of FIG. 13); and perform one of the determination of whether or not the sulfur oxide having a concentration equal to or more than the predetermined concentration is contained in the exhaust gas (Step 1325 of FIG. 13) and the detection of the concentration of the sulfur oxide in the exhaust gas (Step 1410 of FIG. 14); and the temperature control part is configured to:

control, when the application voltage control for the air-fuel ratio detection is being performed, the amount of energization so that the temperature of the element part matches a first temperature in accordance with a first temperature characteristic, which is a relationship between the impedance of the element part and the temperature of the element part in a case where the application voltage control for the air-fuel ratio detection is being performed; and control, when the application voltage control for the SOx detection is being performed, the amount of energization so that the temperature of the element part matches a second temperature, which is one of a temperature equal to the first temperature and a temperature different from the first temperature, in accordance with a second temperature characteristic, which is a relationship between the impedance of the element part and the temperature of the element part in a case where the application voltage control for the SOx detection is being performed.

As a result of study of the inventor(s) of the present application, it has become clear that the "change in output current" unlikely to be affected by the "oxide containing components other than the sulfur oxide" occurs due to a phenomenon that the "sulfur adsorbed to the first electrode" returns to the sulfur oxide through the reoxidation reaction on the first electrode "during the voltage decrease sweep". Further, it has become clear that a degree of the "change in output current" significantly changes in accordance with a voltage decrease amount per predetermined elapsed time period (namely, voltage decrease speed) during the voltage decrease sweep (see FIG. 5A and FIG. 5B). Mechanisms of the occurrences of those phenomena are predicted as follows.

In other words, the sulfur (decomposition product of the sulfur oxide) adsorbed to the first electrode as a result of the voltage increase sweep returns to the sulfur oxide through the reoxidation reaction on the first electrode during the voltage decrease sweep. When the voltage increase sweep is performed, decomposition products (for example, hydrogen, which is a decomposition product of water) of the oxygen-containing components other than the sulfur oxide are not adsorbed to the first electrode, and thus such a phenomenon that the decomposition products of the oxygen-containing components other than the sulfur oxide return to the oxygen-containing components through the reoxidation does not substantially occur on the first electrode during the voltage decrease sweep.

Therefore, the "change in output current" generated by the phenomenon that the sulfur adsorbed to the first electrode returns to the sulfur oxide through the reoxidation reaction on the first electrode during the voltage decrease sweep is unlikely to be influenced by the oxygen-containing components other than the sulfur oxide. In other words, the "change in output current" unlikely to be influenced by the oxygen-containing components other than the sulfur oxide occurs during the voltage decrease sweep.

However, when the voltage decrease speed (sweep speed) of the voltage decrease sweep is less than a certain speed, the reoxidation reaction of the sulfur continuously and gradually progresses during the voltage decrease sweep, and the degree of the "change in output current" hardly appears regardless of the concentration of the sulfur oxide.

In contrast, when the voltage decrease speed of the voltage decrease sweep is more than the certain speed, the application voltage decreases while the reoxidation reaction of sulfur has not progressed so much during the voltage decrease sweep, and when the application voltage reaches a voltage in a "certain voltage range in which the reoxidation reaction of the sulfur is active (that is, predetermined voltage range less than a decomposition start voltage of the sulfur oxide)", the reoxidation reaction of the sulfur quickly progresses (the speed of the reoxidation reaction of sulfur quickly increases, a generation frequency of the reoxidation reaction of the sulfur quickly increases), and hence the degree of the change in output current increases as the sulfur oxide concentration increases. In other words, a significant current change for precisely detecting the sulfur oxide concentration appears.

Thus, the voltage decrease speed of the voltage decrease sweep is set so as to be a "speed at which the speed of the reoxidation reaction quickly increases after a time point at which the application voltage reaches a voltage in the first voltage range and in a voltage range more than the first voltage". Thus, the change in output current not influenced by the oxygen-containing components other than the sulfur oxide more significantly appears as the sulfur oxide concentration increases.

The detection device of one embodiment of the present disclosure is configured to acquire the parameter correlating with the "degree of the change generated in the output current" caused by such a reoxidation reaction of the sulfur. Thus, this parameter is a parameter changing in accordance with the sulfur oxide concentration in the exhaust gas.

Further, the detection device of one embodiment of the present disclosure is configured to determine whether or not the sulfur oxide having a concentration equal to or more than a predetermined concentration is contained in the exhaust gas, or to detect the concentration of the sulfur oxide in the exhaust gas based on the acquired parameter. Thus, it is possible to precisely determine the absence/presence of the sulfur oxide having a concentration equal to or more than the predetermined concentration and being contained in the exhaust gas or precisely detect the concentration of the sulfur oxide in the exhaust gas.

Further, when the detection device of one embodiment of the present disclosure acquires such an output current change, the detection device of one embodiment of the present disclosure may avoid the variation of the output current in accordance with the temperature of the element part (referred to as "element temperature"), thereby avoiding a decrease in detection precision. Therefore, the detection device of one embodiment of the present disclosure needs to maintain the element temperature at a predetermined temperature (predetermined temperature equal to or more than the temperature at which the oxide ion conductivity of the solid electrolyte body of the element part appears).

Therefore, the detection device of one embodiment of the present disclosure is configured to use the impedance of the element part to apply feedback control to the amount of energization to a heater configured to heat the element part through use of such a characteristic that the impedance of the element part changes in accordance with the temperature of the element part, to thereby maintain the temperature of the element part at the constant predetermined temperature.

However, when the detection device of one embodiment of the present disclosure performs the application voltage sweep for the SOx concentration detection, the application voltage is more than the application voltage used for detecting the air-fuel ratio A/F. Thus, types of component reacting on the electrodes are different from types of component in a case of detecting the air-fuel ratio A/F. Therefore, when the application voltage sweep is performed, the electrode interface resistance is different from the electrode interface resistance in the case where the application voltage control is performed for the air-fuel ratio A/F detection.

As a result, when the SOx concentration detection is performed, the relationship between the temperature of the element part and the impedance of the element part corresponding to this temperature of the element part is different from this relationship of the electrode interface resistance in the case of the detection of the air-fuel ratio A/F. In other words, the impedance of the element part corresponding to the temperature of the element part in the case of the SOx concentration detection has a value different from the impedance of the element part corresponding to the same temperature of the element part as the temperature of the element part in the case of the detection of the air-fuel ratio.

As a result, when the SOx concentration detection is performed, and the target impedance of the feedback control is set to the same value as that of the detection of the air-fuel ratio, the temperature of the element part may not be maintained to a temperature appropriate for the SOx concentration detection. In this case, the precision of the SOx concentration detection is liable to decrease, which is not preferred.

Thus, the temperature control part of the detection device of one embodiment of the present disclosure is configured to control, when the application voltage control for the air-fuel ratio detection is being performed, the amount of energization so that the temperature of the element part matches the first temperature in accordance with the first temperature characteristic, which is the relationship between the impedance of the element part and the temperature of the element part in the case where the application voltage control for the air-fuel ratio detection is being performed. The temperature control part is configured to control, when the application voltage control for the SOx detection is being performed, the amount of energization so that the temperature of the element part matches the second temperature, which is one of the temperature equal to the first temperature or the temperature different from the first temperature, in accordance with the second temperature characteristic, which is the relationship between the impedance of the element part and the temperature of the element part in the case where the application voltage control for the SOx detection is being performed.

Consequently, the temperature of the element part in the case of the application voltage control for the SOx detection is maintained to the desired temperature (first temperature or second temperature) appropriate for the SOx concentration detection. As a result, the determination of whether or not the concentration of the sulfur oxide in the exhaust gas has a value equal to or more than a predetermined value or the detection of the concentration of the sulfur oxide in the exhaust gas can precisely be performed.

In one aspect of the gas detection device of one embodiment of the present disclosure, the temperature control part is configured to:
  control the amount of energization to the heating part so that the detected impedance of the element part matches a target impedance;
  set a first target impedance corresponding to the first temperature set in accordance with the first temperature characteristic as the target impedance when the application voltage control for the air-fuel ratio detection is being performed (Step 1135 of FIG. 11, Step 1280 of FIG. 12 and FIG. 16, and Step 1290 of FIG. 12 and FIG. 16); and
  set a second target impedance corresponding to one of the first temperature and the second temperature set in accordance with the second temperature characteristic as the target impedance when the application voltage control for the SOx detection is being performed (Step 1240 of FIG. 12 and FIG. 16).

According to the above-mentioned one aspect, the temperature control part is configured to set, when the application voltage control for the air-fuel ratio detection is being performed, the first target impedance corresponding to the first temperature set in accordance with the first temperature characteristic in the case where the application voltage control for the air-fuel ratio detection is being performed as the target impedance. Further, the temperature control part is configured to set, when the application voltage control for the SOx detection is being performed, the second target impedance corresponding to any of the first temperature and the second temperature defined in accordance with the second temperature characteristic in the case where the application voltage control for the SOx detection is being performed as the target impedance. Consequently, the temperature of the element part in the case of the application voltage control for the SOx detection is maintained to the desired temperature (first temperature or second temperature) appropriate for the SOx concentration detection. As a result, the determination of whether or not the concentration of the sulfur oxide in the exhaust gas has a value equal to or more than the predetermined value or the detection of the concentration of the sulfur oxide in the exhaust gas can precisely be performed.

In one aspect of the gas detection device of one embodiment of the present disclosure:
  the measurement control part is configured to detect the air-fuel ratio before performing the voltage application control for the SOx detection (Step 1230 of FIG. 16); and
  the temperature control part is configured to correct the relationship between the impedance of the element part and the temperature of the element part defined by the second temperature characteristic so as to be such a relationship that the impedance of the element part with respect to the temperature of the element part increases as the detected air-fuel ratio increases, and to define the second target impedance based on the corrected second temperature characteristic (Step 1610 of FIG. 16).

According to the above-mentioned one aspect, the temperature control part is configured to define the second target impedance based on the second temperature characteristic corrected in accordance with the change in air-fuel ratio. Consequently, the element temperature in the case of the application voltage control for the SOx detection is maintained to the desired temperature appropriate for the SOx concentration detection. As a result, the determination of whether or not the concentration of the sulfur oxide in the exhaust gas has a value equal to or more than the predetermined value or the detection of the concentration of the sulfur oxide in the exhaust gas can precisely be performed.

In one aspect of the gas detection device of one embodiment of the present disclosure:
  the measurement control part is configured to detect the air-fuel ratio before performing the voltage application control for the SOx detection; and
  the temperature control part is configured to correct the second target impedance based on the detected air-fuel ratio, and to set the corrected second target impedance as the target impedance.

According to the above-mentioned one aspect, the temperature control part is configured to set the second target impedance corrected in accordance with the change in air-fuel ratio as the target impedance. Consequently, the element temperature in the case of the application voltage control for the SOx detection is maintained to the desired temperature appropriate for the SOx concentration detection. As a result, the determination of whether or not the concentration of the sulfur oxide in the exhaust gas has a value equal to or more than the predetermined value or the detection of the concentration of the sulfur oxide in the exhaust gas can precisely be performed.

In one aspect of the gas detection device of one embodiment of the present disclosure, a voltage decrease speed of the voltage decrease sweep is set so as to be a speed at which a speed of the reoxidation reaction quickly increases after a time point at which the application voltage becomes a voltage in the first voltage range and in a voltage range more than the first voltage.

In the above-mentioned case, the change in output current that is not influenced by the oxygen-containing components other than the sulfur oxide more significantly appears as the sulfur oxide concentration increases, the parameter correlating with the degree of the change in output current can thus be acquired, and the determination of whether or not the concentration of the sulfur oxide in the exhaust gas has a value equal to or more than the predetermined value or the detection of the concentration of the sulfur oxide in the exhaust gas can precisely be performed based on the acquired parameter.

In the above description, for easier understanding of the present disclosure, the terms and/or reference symbols used in embodiments of the present disclosure described later are enclosed in parentheses and assigned to the components of the present disclosure corresponding to the embodiments. However, the constituent elements of the present disclosure are not limited to the embodiments defined by the terms and/or reference symbols. Other objects, other features, and accompanying advantages of the present disclosure are easily understandable from the description of the embodiments of the present disclosure to be given with reference to the following drawings.

DETAILED DESCRIPTION

Now, with reference to the accompanying drawings, a gas detection device according to each embodiment of the present disclosure is described. In all figures of the embodiments, the same or corresponding parts are denoted by the same reference symbols.

First Embodiment

Figure 1:
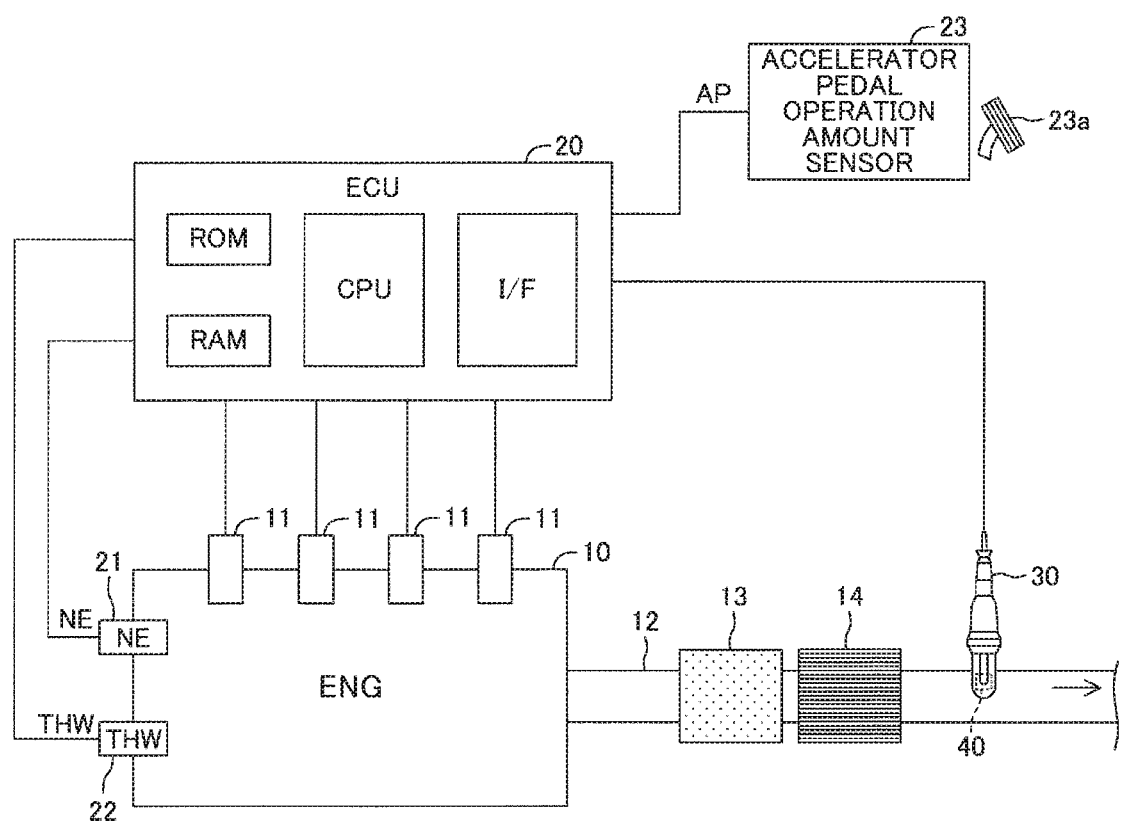
FIG. 1 is a schematic configuration diagram for illustrating a gas detection device according to a first embodiment of the present disclosure, and an internal combustion engine to which the gas detection device is applied.

A description is now given of a gas detection device (hereinafter sometimes referred to as "first detection device") according to a first embodiment of the present disclosure. The first detection device is applied to an "internal combustion engine 10 illustrated in FIG. 1" installed on a vehicle (not shown).

The internal combustion engine 10 is a well-known diesel engine. The internal combustion engine 10 includes combustion chambers (not shown) and fuel injection valves 11. The fuel injection valve 11 is arranged on a cylinder head part so as to inject fuel into the combustion chambers. The fuel injection valve 11 is configured to directly inject fuel into the combustion chamber in accordance with an instruction of the ECU 20 described later. An exhaust pipe 12 is connected to an end of an exhaust manifold (not shown) connected to exhaust ports communicating to the combustion chambers (not shown). The exhaust ports, the exhaust manifold, and the exhaust pipe 12 form an exhaust gas passage through which the exhaust gas exhausted from the combustion chambers flows. A diesel oxidation catalyst (DOC) 13 and a diesel particulate filter (DPF) 14 are arranged on the exhaust pipe 12.

The DOC 13 is an exhaust gas purification catalyst. Specifically, the DOC 13 uses precious metal, for example, platinum or palladium, as a catalyst to oxide unburnt components (HC and CO) in the exhaust gas, thereby purifying the exhaust gas. In other words, the HC is oxidized to water and $CO_2$, and CO is oxidized to $CO_2$ by the DOC 13.

The DPF 14 is arranged on downstream of the DOC 13. The DPF 14 is a filter for trapping particulates in the exhaust gas. Specifically, the DPF 14 includes a plurality of passages formed by a porous material (e.g., partitions formed by cordierite, which is a type of ceramic). The DPF 14 is configured to collect particulates contained in the exhaust gas passing through the partitions on a porous surface of the partitions.

The first detection device includes the ECU 20. The ECU 20 is an electronic control circuit including, as a main component, a microcomputer including a CPU, a ROM, a RAM, a backup RAM, and an interface (I/F). The CPU is configured to execute instructions (routines) stored in a memory (ROM) to implement predetermined functions.

The ECU 20 is connected to various actuators (fuel injection valves 11 and the like) of the internal combustion engine 10. The ECU 20 is configured to transmit drive (instruction) signals to those actuators, to thereby control the internal combustion engine 10. Further, the ECU 20 is connected to various sensors described later, and is configured to receive signals from those sensors.

Engine rotation speed sensor 21: an engine rotation speed sensor (hereinafter referred to as "NE sensor") 21 is configured to measure a rotation speed (engine rotation speed) NE of the internal combustion engine 10, and output a signal representing this engine rotation speed NE.

Water temperature sensor 22: a water temperature sensor 22 is arranged in a cylinder block part. The water temperature sensor 22 is configured to measure a temperature (coolant temperature THW) of coolant for cooling the internal combustion engine 10, and output a signal representing this coolant temperature THW.

Accelerator pedal operation amount sensor 23: an accelerator pedal operation amount sensor 23 is configured to detect an operation amount (accelerator opening degree) AP of an accelerator pedal 23a of the vehicle, and output a signal representing the accelerator operation amount AP.

Gas sensor 30: a gas sensor 30 is a limiting current type gas sensor of one cell type, and is arranged in an exhaust pipe 12 constructing an exhaust passage of the engine 10. The gas sensor 30 is arranged on downstream of the DOC 13 and the DPF 14 interposed in the exhaust pipe 12.

(Construction of Gas Sensor)

Figure 2:
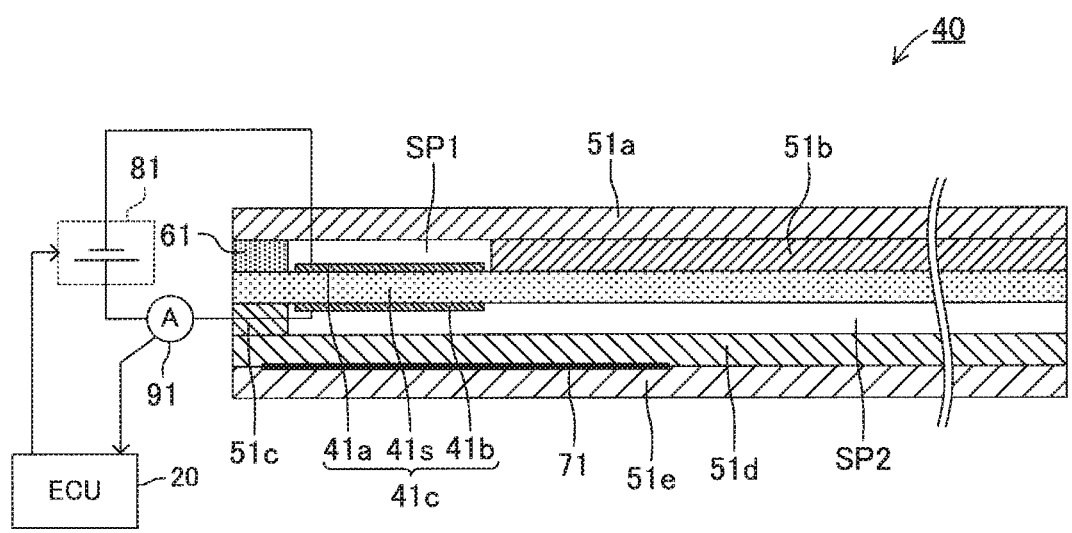
FIG. 2 is a schematic sectional view for illustrating an example of a configuration of an element part of a gas sensor illustrated in FIG. 1.

With reference to FIG. 2, a description is now given of a construction of the gas sensor 30. An element part 40 provided for the gas sensor 30 includes a solid electrolyte body 41s, a first alumina layer 51a, a second alumina layer 51b, a third alumina layer 51c, a fourth alumina layer 51d, a fifth alumina layer 51e, a diffusion resistance part (diffusion speed regulation layer) 61, and a heater 71.

The solid electrolyte body 41s contains zirconia and the like, and is a thin plate body having oxide ion conductivity. The zirconia forming the solid electrolyte body 41s may contain elements such as scandium (Sc) and yttrium (Y).

The first to fifth alumina layers 51a to 51e are dense (gas impermeable) layers (dense thin plate bodies) containing alumina.

The diffusion resistance part 61 is a porous diffusion speed regulation layer, and is a gas permeable layer (thin plate body). The heater 71 is a thin plate body made of cermet containing platinum (Pt) and ceramic (e.g., alumina), and is a heat generation body for generating heat through energization (a current supply). The heater 71 is connected to a power supply (not shown) installed on the vehicle through lead wires (not shown). The heater 71 is configured to change the heat generation amount through control of "electric energy supplied from its power supply" by the ECU 20.

The respective layers of the element part 40 are layered from the bottom in a sequence of the fifth alumina layer 51e, the fourth alumina layer 51d, the third alumina layer 51c, the solid electrolyte body 41s, the diffusion resistance part 61 and the second alumina layer 51b, and the first alumina layer 51a.

An internal space SP1 is a space formed by the first alumina layer 51a, the solid electrolyte body 41s, the diffusion resistance part 61, and the second alumina layer 51b, and is configured so that the exhaust gas of the internal combustion engine 10 is introduced into an inside thereof as the gas to be detected via the diffusion resistance part 61. In other words, the internal space SP1 communicates to an inside of the exhaust pipe 12 of the internal combustion engine 10 via the diffusion resistance part 61. Thus, the exhaust gas in the exhaust pipe 12 is introduced into the internal space SP1 as the gas to be detected.

A first atmosphere introduction passage SP2 is formed by the solid electrolyte body 41s, the third alumina layer 51c, and the fourth alumina layer 51d, and is opened to the atmosphere outside the exhaust pipe 12.

The first electrode 41a is fixed to a surface (specifically, surface of the solid electrolyte body 41s defining the internal space SP1) on one side of the solid electrolyte body 41s. The first electrode 41a is a negative electrode. The first electrode 41a is a porous cermet electrode containing platinum (Pt) as a main component.

The second electrode 41b is fixed to another surface (specifically, surface of the solid electrolyte body 41s defining the first atmosphere introduction passage SP2) on the other side of the solid electrolyte body 41s. The second electrode 41b is a positive electrode. The second electrode 41b is a porous cermet electrode containing platinum (Pt) as a main component.

The first electrode 41a and the second electrode 41b are arranged so as to oppose each other on both sides of the solid electrolyte body 41s. In other words, the first electrode 41a, the second electrode 41b, and the solid electrolyte body 41s construct an electrochemical cell 41c having an oxygen exhaustion capability through an oxygen pumping action. The electrochemical cell 41c is heated to an activation temperature by the heater 71.

The solid electrolyte body 41s and the respective layers of the first to fifth alumina layers 51a to 51e are formed into a sheet form through, for example, the doctor blade method, the extrusion. The first electrode 41a, the second electrode 41b, wires for the energization to those electrodes, and the like are formed by, for example, the screen print method. The element part 40 having the above-mentioned structure is integrally manufactured by layering those sheets as described above, and firing.

The materials forming the first electrode 41a are not limited to the above-mentioned materials, and may be selected from materials containing an element from the platinum group, for example, platinum (Pt), rhodium (Rh), palladium (Pd), alloy thereof, or the like as main components. The material forming the first electrode 41a is not particularly limited as long as the material can reductively decompose SOx contained in the exhaust gas introduced into the internal space SP1 via the diffusion resistance part 61 when a voltage (specifically, voltage equal to or more than approximately 0.6 V) equal to or more than a SOx decomposition start voltage is applied between the first electrode 41a and the second electrode 41b.

The gas sensor 30 further includes a power supply circuit 81 and an ammeter 91. The power supply circuit 81 and the ammeter 91 are connected to the above-mentioned ECU 20.

The power supply circuit 81 is configured to apply a predetermined voltage (hereinafter also referred to as "application voltage Vm") between the first electrode 41a and the second electrode 41b so that the electric potential of the second electrode 41b is more than the electric potential of the first electrode 41a. The power supply circuit 81 is configured to be controlled by the ECU 20 so as to change the application voltage Vm.

The ammeter 91 is configured to measure an output current (electrode current) Im, which is a current flowing between the first electrode 41a and the second electrode 41b (that is, current flowing through the solid electrolyte body 41s), and output a measurement value to the ECU 20.

The first detection device is configured to calculate an impedance (element impedance) of the element part 40 based on the electrode current Im detected when a predetermined high-frequency voltage is applied between the first electrode 41a and the second electrode 41b.

<Overview of Operation>

A description is now given of an overview of an operation performed by the first detection device. The first detection device is configured to detect an oxygen concentration of the exhaust gas (gas to be detected) exhausted from the internal combustion engine 10. The first detection device is configured to detect an air-fuel ratio (A/F) of mixture in the combustion chamber of the internal combustion engine 10 based on the oxygen concentration in the exhaust gas. In the following, the air-fuel ratio of the mixture in the combustion chamber of the internal combustion engine 10 is also referred to as "air-fuel ratio A/F of the engine or simply air-fuel ratio A/F". Further, the first detection device is configured to determine absence/presence of SOx having a concentration equal to or more than a predetermined concentration and being contained in the exhaust gas. The first detection device requires some seconds from a detection start to a detection end of the absence/presence of SOx having a concentration equal to or more than the predetermined concentration, and is thus configured to determine the absence/presence of SOx having a concentration equal to or more than the predetermined concentration under a state in which the air-fuel ratio A/F of the engine is stable. As the predetermined concentration, an arbitrary concentration more than 0% and corresponding to a desired detection level is selected.

Figure 3A:
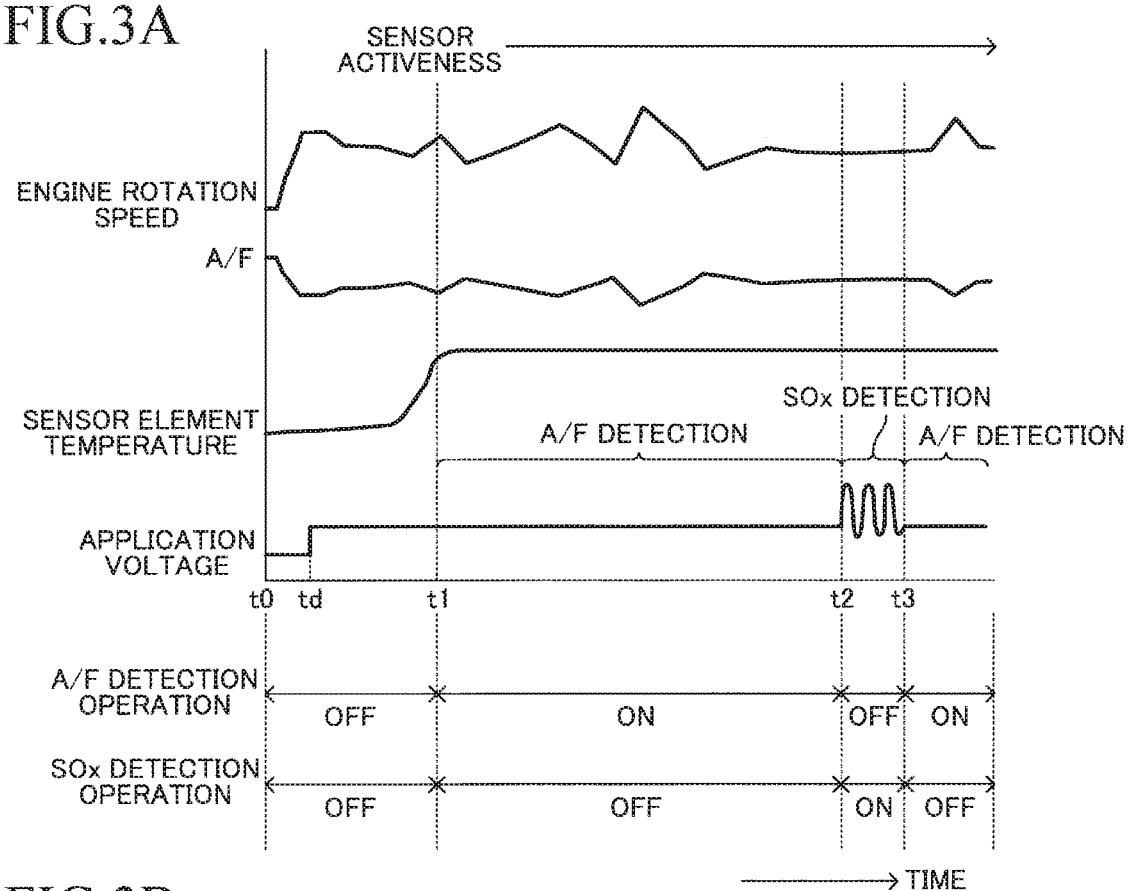
FIG. 3A is a time chart for illustrating an overview of an operation of the gas detection device according to the first embodiment of the present disclosure.

Specifically, as illustrated in FIG. 3A, when a time point t0, which is a time point at which the starting of the internal combustion engine 10 is started, is reached, the first detection device starts the control for the heater 71 so that the solid electrolyte body 41s is heated by the heater 71. As a result, the solid electrolyte body 41s is heated to a predetermined temperature equal to or more than a temperature (hereinafter sometimes referred to as "activation temperature") at which oxide ion conductivity appears.

At a time point t1, when the temperature (sensor element temperature) of the solid electrolyte body 41s becomes equal to or more than the activation temperature, and the gas sensor 30 enters an active state, the first detection device starts processing of detecting the oxygen concentration of the exhaust gas, and acquiring the air-fuel ratio A/F of the engine based on the oxygen concentration. At a time point td between the time point t0 to the time point t1, the first detection device starts application (sometimes referred to as "application voltage control for the A/F detection") of a voltage (specifically, 0.3 V) for the oxygen concentration (A/F) detection appropriate for the detection of the oxygen concentration between the first electrode 41a and the second electrode 41b. In other words, the first detection device sets the application voltage Vm to the voltage for the oxygen concentration detection. When the temperature of the solid electrolyte body 41s is equal to or more than the activation temperature, and the application voltage Vm is set to the voltage for the oxygen concentration detection, the oxygen molecules are decomposed, and the oxygen pumping action thus appears. However, gasses of oxygen-containing components (including SOx) other than the oxygen are not decomposed.

The first detection device continuously detects the oxygen concentration from the time point t1, to thereby monitor the air-fuel ratio A/F of the engine. Then, when a SOx detection start condition is satisfied (that is, when the air-fuel ratio A/F of the engine enters a stable state, and other conditions described later are simultaneously satisfied) at a time point t2, the first detection device starts processing of detecting the SOx concentration in the exhaust gas. The SOx concentration detection herein means both detection (measurement) of the concentration itself of SOx contained in the exhaust gas, and acquisition of a parameter representing the concentration (SOx concentration in the exhaust gas) of SOx contained in the exhaust gas. The first detection device is configured to acquire the parameter (parameter changing in accordance with the SOx concentration) representing the SOx concentration in the exhaust gas, and use the parameter to determine whether or not the SOx having a concentration equal to or more than the predetermined concentration is contained in the exhaust gas as described later.

In other words, in the period from the time point t1 to a time point immediately before the time point t2, the first detection device detects the air-fuel ratio A/F of the engine, and stops the detection of the air-fuel ratio A/F of the engine at the time point t2, which is a time point of starting the SOx concentration detection.

In a period from the time point t2 to a time point immediately before a time point t3, the first detection device performs application voltage control for the SOx concentration detection. Specifically, the first detection device performs an application voltage sweep in a predetermined sweep voltage range. In other words, the first detection device performs a "voltage increase sweep from a first voltage V1 to a second voltage V2 of gradually increasing" the application voltage Vm, and then performs a "voltage decrease sweep from the second voltage V2 to the first voltage V1 of gradually decreasing" the application voltage Vm. The first detection device is configured to perform an application voltage sweep, one cycle of which is constructed by the voltage increase sweep for once and the voltage decrease sweep for once, for a plurality of cycles (e.g., three cycles). The first detection device may perform only the one cycle of the application voltage sweep.

Figure 3B:
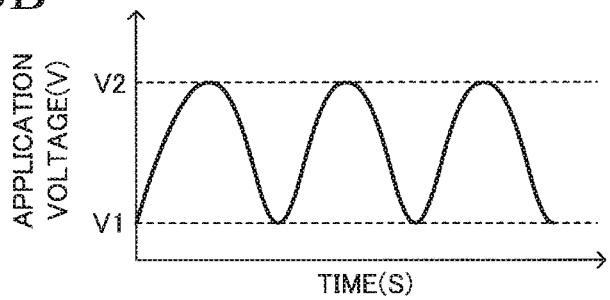
FIG. 3B is a graph for showing a waveform of an application voltage exhibited when SOx detection is performed.

More specifically, as shown in FIG. 3B, the first detection device is configured to apply a voltage having a waveform of a sinusoidal wave between the first electrode 41a and the second electrode 41b, to thereby perform the application voltage sweep. The voltage waveform in this case is not limited to the sinusoidal wave shown in FIG. 3B, and various waveforms may be employed. For example, the voltage waveform in this case may be a non-sinusoidal wave (waveform similar to a voltage waveform when a capacitor is charged/discharged) shown in the graph of FIG. 3C.

When the SOx concentration detection is finished at the time point t3, the first detection device resumes the processing of detecting the air-fuel ratio A/F of the engine. In other words, the first detection device sets the application voltage Vm to the voltage (0.3 V) for the oxygen concentration detection at the time point t3.

(A/F Detection)

A description is now given of an operation when the above-mentioned air-fuel ratio A/F of the engine is detected. The first detection device is configured to set the application voltage Vm to the voltage (e.g., 0.3 V) for the oxygen concentration detection so that the first electrode 41a is at a low electric potential and the second electrode 41b is at a high electric potential in order to acquire the air-fuel ratio A/F of the engine when the gas sensor 30 enters the state in which the sensor is active. In other words, the first electrode 41a functions as a negative electrode, and the second electrode 41b functions as a positive electrode. The voltage for the oxygen concentration detection is set to a voltage that is equal to or more than a voltage (decomposition start voltage) at which the decomposition of the oxygen ($O_2$) starts on the first electrode 41a, and at which a limiting current of the oxygen described later is observed, and simultaneously a voltage less than decomposition start voltages of the oxygen-containing components other than the oxygen. As a result, the oxygen contained in the exhaust gas is reductively decomposed into oxide ions ($O^{2-}$) on the first electrode 41a.

The oxide ions are conducted to the second electrode 41b via the solid electrolyte body 41s to become oxygen ($O_2$), and are then exhausted to the atmosphere via the atmosphere introduction passage SP2. As described above, the movement of the oxygen through the conduction of the oxide ion from the negative electrode (first electrode 41a) to the positive electrode (second electrode 41b) via the solid electrolyte body 41s is referred to as "oxygen pumping action".

As a result of the conduction of the oxygen ion caused by this oxygen pumping action, a current flows between the electrode 41a and the electrode 41b. The current flowing between the electrode 41a and the electrode 41b is referred to as "output current Im (or electrode current Im)". The output current Im has a tendency of generally increasing as the application voltage Vm increases. However, the flow amount of the exhaust gas that reaches the first electrode 41a is restricted by the diffusion resistance part 61, and a consumption speed of the oxygen caused by the oxygen pumping action eventually becomes more than a supply speed of the oxygen to the first electrode 41a. In other words, the reductive decomposition action of the oxygen on the first electrode 41a (negative electrode) enters a diffusion speed regulated state.

When the reductive decomposition reaction of the oxygen on the first electrode 41a enters the diffusion speed regulated state, even when the application voltage Vm is increased, the output current Im does not increase, and becomes approximately constant. This characteristic is referred to as "limiting current characteristic". A range of the application voltage obtained when the limiting current characteristic appears (is observed) is referred to as "limiting current range". Further, the output current Im in the limiting current range is referred to as "limiting current". A magnitude (limiting current value) of the limiting current with respect to the oxygen corresponds to the supply speed of the oxygen to the first electrode 41a (negative electrode). As described above, the flow rate of the exhaust gas that reaches the first electrode 41a is maintained to be constant by the diffusion resistance part 61, and hence the supply speed of the oxygen to the first electrode 41a corresponds to the concentration of the oxygen contained in the exhaust gas.

Thus, the output current (limiting current) Im corresponds to the concentration of the oxygen contained in the exhaust gas in the gas sensor 30 when the application voltage Vm is set to a "predetermined voltage (specifically, 0.3 V) in the limiting current range of the oxygen". The first detection device is configured to use the limiting current characteristic of the oxygen to detect the concentration of the oxygen contained in the exhaust gas as the gas to be detected in this way. On the other hand, the air-fuel ratio A/F of the engine and the concentration of the oxygen in the exhaust gas have a one-to-one relationship. Thus, the first detection device is configured to store this relationship in the ROM in advance, and acquire the air-fuel ratio A/F of the engine based on the relationship and the detected oxygen concentration. The first detection device may be configured to store a relationship between the limiting current of the oxygen and the air-fuel ratio A/F of the engine in the ROM in advance, and to acquire the air-fuel ratio A/F of the engine based on the relationship and the detected limiting current of the oxygen.

(SOx Concentration Detection)
[Detection Principle]

A description is now given of how to detect the SOx concentration in the exhaust gas (gas to be detected). The above-mentioned oxygen pumping action occurs to oxygen-containing components, for example, "SOx (sulfur oxide), $H_2O$ (water), and the like" containing oxygen atoms in molecules. In other words, when a voltage equal to or more than the decomposition start voltage of each of those compounds is applied between the first electrode 41a and the second electrode 41b, each of the compounds is reductively decomposed, resulting in generation of oxide ions. The oxide ion is conducted from the first electrode 41a to the second electrode 41b through the "oxygen pumping action". As a result, the output current Im flows between the first electrode 41a and the second electrode 41b.

However, the concentration of SOx contained in the exhaust gas is extremely low, and the current caused by the decomposition of SOx is also very small. Further, a current caused by the decomposition of the oxygen-containing components (e.g., water, carbon dioxide) other than SOx also flows between the first electrode 41a and the second electrode 41b. Therefore, it is difficult to precisely detect only the output current caused by SOx.

Thus, the inventor(s) of the present application has/have obtained through extensive study such knowledge that the SOx concentration can precisely be detected by performing an application voltage sweep one cycle of which is constructed by a voltage increase sweep and a "voltage decrease sweep at a predetermined sweep speed" when the SOx concentration is detected.

The voltage increase sweep is processing of gradually increasing the application voltage Vm from the first voltage V1 to the second voltage V2. The voltage decrease sweep is processing of gradually decreasing the application voltage Vm from the second voltage V2 to the first voltage V1. The first voltage V1 and the second voltage V2 are electric potentials of the second electrode 41b with respect to the electric potential of the first electrode 41a as a reference, and is a positive voltage value.

The first voltage V1 is set to a voltage in a voltage range (hereinafter also referred to as "first voltage range") less than the decomposition start voltage (approximately 0.6 V) of SOx and more than the minimum value of the application voltage in the limiting current range of oxygen. The minimum value of the application voltage in the limiting current range of oxygen depends on the air-fuel ratio A/F of the engine, and a lower limit value of the first voltage range may be changed in accordance with the air-fuel ratio A/F of the engine. Specifically, the lower limit value of the first voltage range is a voltage in a range of, for example, from 0.2 V to 0.45 V, and the upper limit voltage of the first voltage range is 0.6 V. In other words, the first voltage is a voltage selected from a range of 0.2 V or more and less than 0.6 V.

The second voltage V2 is set to a voltage in a voltage range (hereinafter also referred to as "second voltage range") more than the decomposition start voltage (approximately 0.6 V) of SOx, and less than an upper limit voltage (2.0 V) of a voltage at which the solid electrolyte body 41s is not destructed. In other words, the second voltage V2 is a voltage selected in the range of more than 0.6 V and equal to or less than 2.0 V.

Figure 4A:
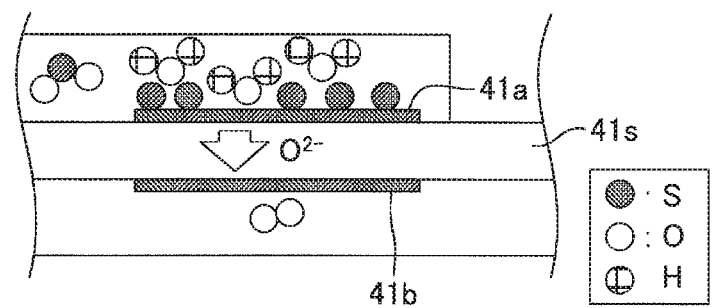
FIG. 4A is a schematic diagram for illustrating decomposition reaction of SOx generated in the element part.

When the application voltage Vm applied between the first electrode 41a and the second electrode 41b becomes equal to or more than the decomposition start voltage of SOx in a period of the voltage increase sweep, as illustrated in FIG. 4A, SOx contained in the exhaust gas is reductively decomposed into S and $O^{2-}$ on the first electrode 41a (negative electrode). As a result, a reductive decomposition product (S (sulfur)) of SOx is adsorbed to the first electrode 41a (negative electrode).

Figure 4B:
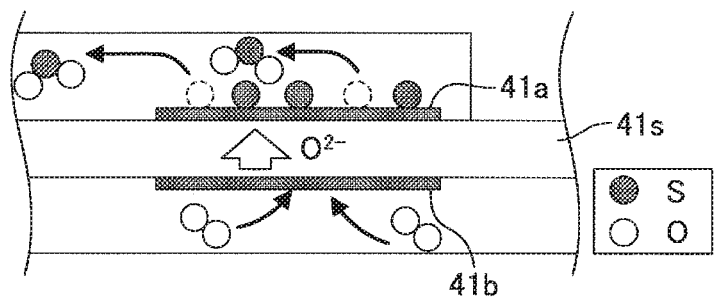
FIG. 4B is a schematic diagram for illustrating a reoxidation reaction of sulfur generated in the element part.

When the application voltage Vm becomes less than the decomposition start voltage of SOx in a period of the voltage decrease sweep, as illustrated in FIG. 4B, there occurs such a reaction (hereinafter sometimes referred to as "reoxidation reaction of S (sulfur)") that S adsorbed to the first electrode 41a (negative electrode) and $O^{2-}$ react with each other to generate SOx. On this occasion, the output current Im changes resulting from the "reoxidation reaction of S" as described later. This change in the output current Im caused by the "reoxidation reaction of S" is referred to as "reoxidation current change".

Figure 5A:
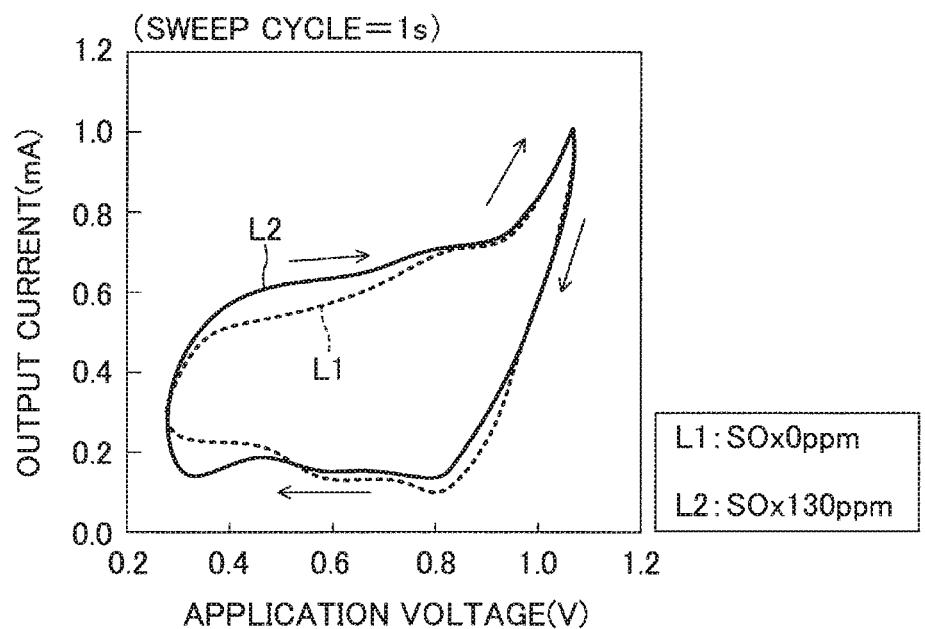
FIG. 5A is a graph for showing a relationship between an application voltage and an output current.
Figure 5B:
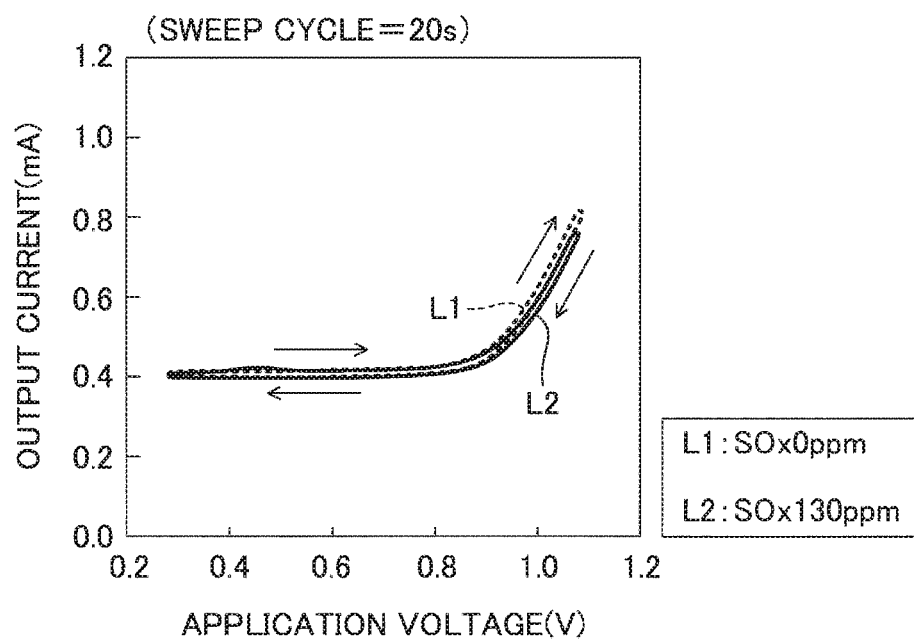
FIG. 5B is a graph for showing a relationship between the application voltage and the output current.

Incidentally, as a result of study of the inventor(s) of the present application, it has become clear that a significant reoxidation current change may not appear in the SOx concentration detection depending on the sweep speed (voltage decrease amount per predetermined elapsed time period) of the voltage decrease sweep. With reference to FIG. 5A and FIG. 5B, a description is now given of this point.

FIG. 5A is a schematic graph for showing a relationship between the application voltage Vm and the output current Im when the application voltage sweep is performed while a sweep cycle (namely, a sum of the period required for the voltage increase sweep and the period required for the voltage decrease sweep, a cycle of the application voltage sweep) is set to one second. FIG. 5B is a schematic graph for showing the relationship between the application voltage Vm and the output current Im when the application voltage sweep is performed at a sweep speed (sweep cycle: 20 seconds) less than that in the example shown in FIG. 5A. The waveform of the application voltage Vm in this case is the sinusoidal waveform shown in FIG. 3B.

When both of the graphs are compared with each other, a difference (difference of current values) between the "output current Im when the SOx concentration of the gas to be detected is 0 ppm" represented as a line L1 and the "output current Im when the SOx concentration of the gas to be detected is 130 ppm" represented as a line L2 in a voltage range less than the decomposition start voltage (0.6 V) of SOx appears more clearly in the example of FIG. 5A, which is less in the sweep speed of the voltage application sweep than in the example of FIG. 5B. In other words, a current change (reoxidation current change) significant for the SOx concentration detection appears in the example of FIG. 5A. A mechanism of generating such a phenomenon is considered as follows.

In other words, when the sweep speed is less than a predetermined speed, the reoxidation reaction of S progresses continuously and gradually during the voltage decrease sweep, and a significant reoxidation current change does not appear. On the other hand, when the sweep speed is more than the predetermined sweep speed, it is considered that the application voltage Vm decreases while the reoxidation reaction of S has not progressed so much during the voltage decrease sweep, and when the application voltage Vm becomes a voltage in a "certain voltage range in which the reoxidation reaction of S becomes active", the reoxidation reaction of S quickly progresses. As a result, a current change significant for the SOx concentration detection appears.

Whether or not the current change significant for the SOx concentration detection occurs depends on the sweep speed in this way when the voltage decrease sweep is performed. Thus, when the voltage decrease sweep is performed, the sweep speed needs to be such a predetermined speed that the significant current change representing the reoxidation current change appears.

This predetermined speed is set to an appropriate speed at which the significant current change representing the reoxidation current change occurs through experiments performed in advance in the first detection device.

According to the experiments, it has become clear that the sweep speed may be set so as to exhibit a frequency F in a predetermined range (typically, a range equal to or more than 0.1 Hz and equal to or less than 5 Hz) when the voltage in the sinusoidal waveform shown in FIG. 3B is applied between the first electrode 41a and the second electrode 41b. The lower limit value of the frequency F in the predetermined range is set from such a viewpoint that the signal difference (reoxidation current change) significant for the SOx concentration detection is no longer acquired when the frequency F has a value less than the lower limit value. The upper limit value of the frequency F in the predetermined range is set from such a viewpoint that a contribution from current change factors (specifically, the volume of the solid electrolyte body 41s and the like) other than the SOx concentration increases when the frequency F has a value more than the upper limit value.

Figure 3C:
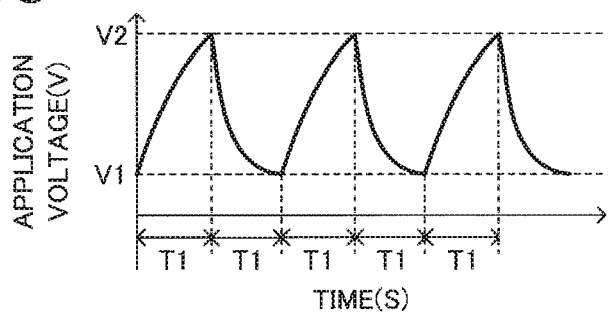
FIG. 3C is a graph for showing another waveform of the application voltage exhibited when the SOx detection is performed.

On the other hand, according to the experiments, it has become clear that the sweep speed may be set to such a sweep speed that a response time constant T1 of the voltage switching waveform is in a predetermined range (typically, a range equal to or more than 0.1 second and equal to or less than 5 seconds) when the voltage in the non-sinusoidal waveform caused by the charge/discharge of a capacitor as shown in FIG. 3C is applied between the first electrode 41a and the second electrode 41b. The response time constant T1 is a period required for the application voltage Vm to change from the lower limit voltage (first voltage) to the upper limit voltage (second voltage) or change in an opposite direction in the predetermined range.

When the predetermined ranges of the frequency F and the response time constant T1 are converted into a period required for the voltage decrease sweep (namely, a period required for reaching the first voltage V1 from the second voltage V2), a range of the period is equal to or more than 0.1 second and equal to or less than 5 seconds. Thus, this period may be in a range equal to or more than 0.1 second and equal to or less than 5 seconds.

Further, it has become clear that the "reoxidation current change" highly depends mainly on the S concentration in the exhaust gas (gas to be detected) as later described with reference to FIG. 6A and FIG. 6B. In other words, the reoxidation current change is less likely to be influenced by "gas (e.g., water) of the oxygen-containing components other than the sulfur oxide (SOx)" in the exhaust gas. In other words, when the voltage increase sweep is performed, decomposition products (for example, hydrogen which is a decomposition product of water) of the "oxygen-containing components other than the sulfur oxide" are not adsorbed to the first electrode 41a, and such a phenomenon that the decomposition products of the "oxygen-containing components other than the sulfur oxide" return to the oxygen-containing components through the reoxidation reaction on the first electrode 41a does not substantially occur in the period of the voltage decrease sweep. Therefore, the SOx concentration in the exhaust gas can precisely be detected through use of the reoxidation current change.

Figure 6A:
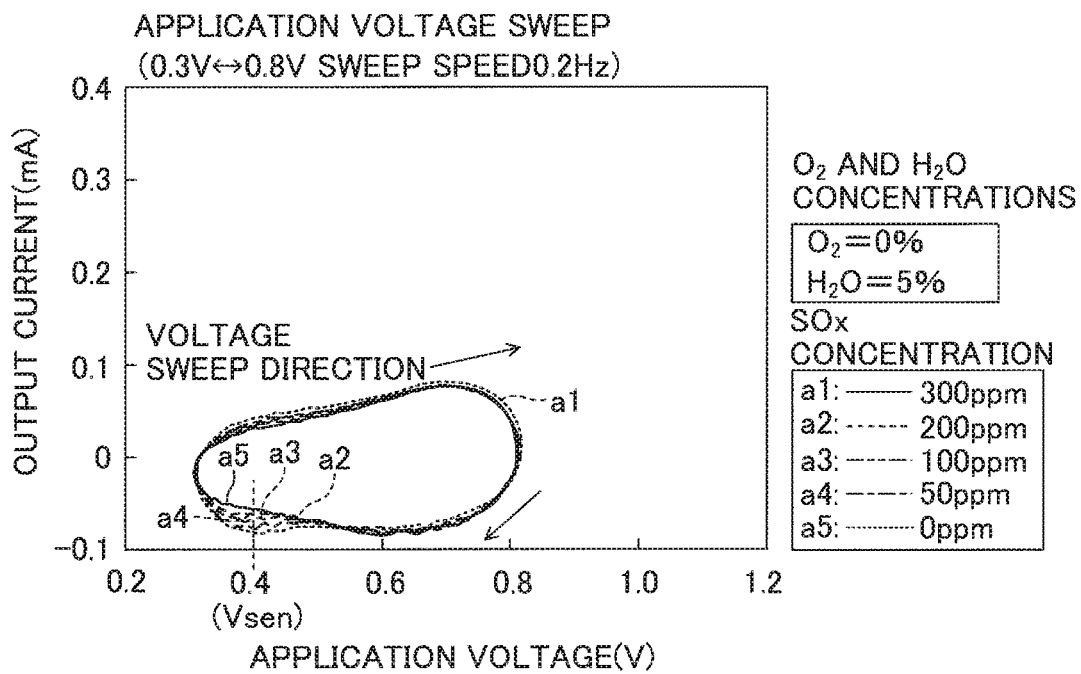
FIG. 6A is a graph for showing a relationship between the application voltage and the output current exhibited when a SOx concentration of exhaust gas (gas to be detected) is variously changed.

FIG. 6A is a graph for schematically showing the relationship between the application voltage (application voltage in the sinusoidal waveform) Vm and the output current Im when the application voltage sweep is performed while the concentration of SOx contained in the exhaust gas (gas to be detected) is variously changed, and the application voltage range and the sweep speed are set to the same conditions. In the example shown in FIG. 6A, it can be verified that the output current Im (reoxidation current Is) at a reoxidation current detection voltage Vsen (=0.4 V) described later decreases as the concentration of the SOx in the exhaust gas increases.

Figure 6B:
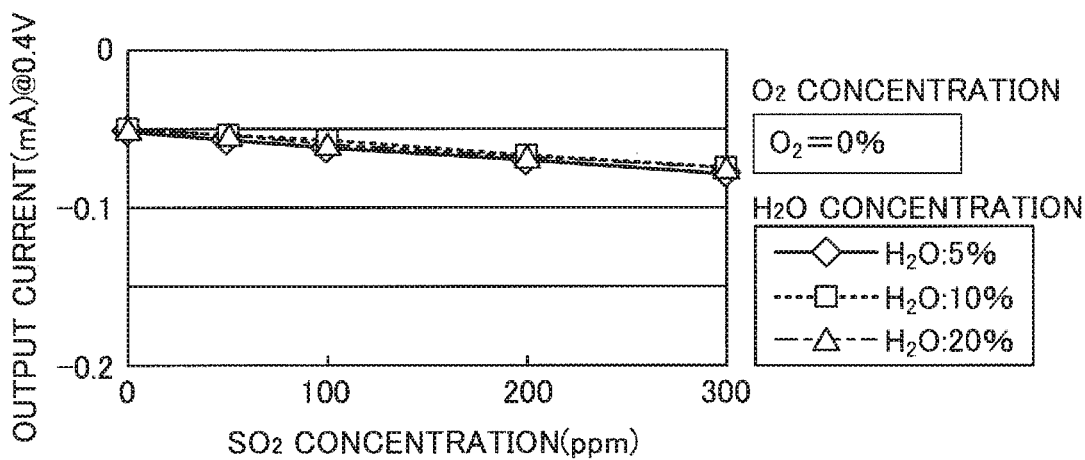
FIG. 6B is a graph for showing a relationship between the output current and the SOx ($SO_2$) concentration exhibited when an $H_2O$ concentration of the exhaust gas (gas to be detected) is variously changed.

FIG. 6B is a graph for showing a relationship between the SOx concentration ($SO_2$ concentration) and the output current Im (reoxidation current Is) at the reoxidation current detection voltage Vsen when the application voltage sweep is performed under the same condition as that of FIG. 6A while the concentration of $H_2O$ contained in the exhaust gas (gas to be detected) is changed to various values. With reference to the example shown in FIG. 6B, it can be verified that the output current Im (reoxidation current Is) at the reoxidation current detection voltage Vsen (=0.4 V) depends on the SOx concentration in the exhaust gas, but does not depend on the concentration of $H_2O$ in the exhaust gas. From the above, it is understood that the concentration of SOx in the exhaust gas can precisely be detected through use of the reoxidation current change without being influenced by the "oxygen-containing components (e.g., water) other than SOx" in the exhaust gas. Thus, the first detection device is configured to use this reoxidation current change to detect the SOx concentration (actually, absence/presence of the SOx having a concentration equal to or more than the predetermined concentration).

[Parameter for Detecting Reoxidation Current Change]

The first detection device is configured to acquire a parameter appropriately (precisely) representing a "degree of the reoxidation current change", and detect the SOx concentration based on this parameter. More specifically, the first detection device is configured to acquire the output current Im (hereinafter referred to as "reoxidation current Is") when the application voltage Vm during the voltage decrease sweep is the "above-mentioned reoxidation current detection voltage Vsen selected from the first voltage range (less than the decomposition start voltage of SOx)" during the voltage decrease sweep. Further, the first detection device is configured to acquire a base current Ibas described later. Then, the first detection device is configured to acquire a difference Id (=Ibas−Is) between the base current Ibas and the reoxidation current Is as the "parameter (appropriately) representing the degree of the reoxidation current change".

The base current Ibas is the output current Im at the reoxidation current detection voltage Vsen when exhaust gas not containing S is caused to communicate through the exhaust passage in advance, and the application voltage sweep is performed under the same condition (with the same waveform, the same voltage range, and the same sweep speed) as that in a case in which the SOx concentration in the exhaust gas is actually detected. The reoxidation current Is may be an average reoxidation current Iave acquired by averaging a plurality of "output currents Im at the reoxidation current detection voltage Vsen" acquired by performing the application voltage sweep for a plurality of times. Then, the first detection device is configured to perform the SOx concentration detection based on this parameter (difference Id).

[SOx Concentration Detection Method]

The first detection device is configured to use the above-mentioned detection principle for the SOx concentration to perform the SOx concentration detection as follows.

The first detection device performs the application voltage sweep at the "predetermined sweep speed" at which the significant reoxidation current change occurs as described above. In this case, a particularly important point is the voltage decrease sweep speed.

On this occasion, the first detection device is configured to determine the voltage range of the application voltage sweep based on the air-fuel ratio A/F of the engine detected through use of the oxygen concentration in the exhaust gas.

The first detection device is configured to detect the output current Im at the reoxidation current detection voltage Vsen during the voltage decrease sweep as the reoxidation current Is.

The first detection device is configured to calculate the difference Id (=Ibas−Is) between the base current Ibas and the reoxidation current Is.

The first detection device is configured to determine whether or not the SOx having the predetermined concentration or more is contained based on the difference Id. The difference Id has a value equal to or more than 0, and is thus equal to the magnitude of the difference Id.

Specifically, the first detection device is configured to apply the voltage having the voltage waveform of the sinusoidal wave shown in FIG. 3B between the first electrode 41a and the second electrode 41b when the SOx concentration detection is performed. On this occasion, the first detection device is configured to perform the application voltage sweep (voltage increase sweep and the voltage decrease sweep) in the predetermined voltage range at the above-mentioned sweep speed (frequency in the above-mentioned frequency range) at which the above-mentioned current change significant for the SOx concentration detection occurs.

Figure 7:
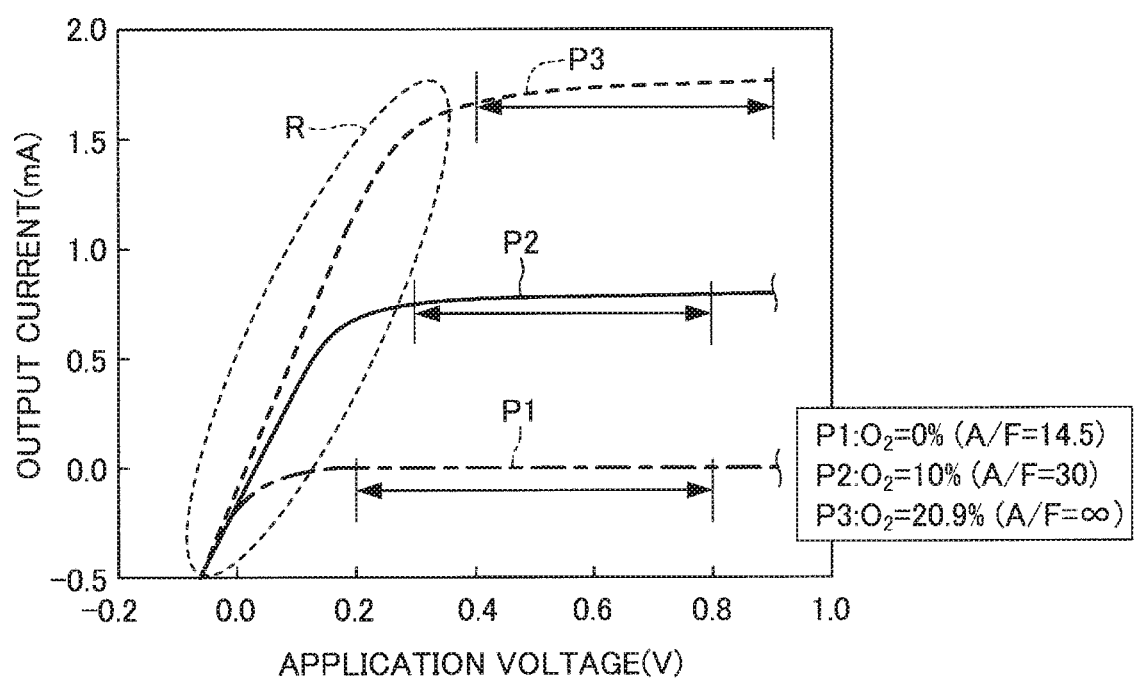
FIG. 7 is a graph for showing a relationship between an air-fuel ratio A/F of mixture in a combustion chamber and a limiting current region of the oxygen.

In other words, the first detection device is configured to determine the voltage range of the application voltage sweep (the upper limit voltage and the lower limit voltage of the sweep of the application voltage) based on the air-fuel ratio A/F of the engine. Specifically, as shown in FIG. 7, the lower limit voltage of the application voltage sweep is set so as to avoid detection of the output current Im in an internal resistance dependent region surrounded by a dotted line R, and to be a voltage more than the minimum value of the voltage of the limiting current region of the oxygen. This internal resistance dependent region is a region in which the output current Im increases as the application voltage Vm increases. The upper limit voltage of the application voltage Vm in the internal resistance dependent region increases as the air-fuel ratio A/F of the engine becomes leaner (as the oxygen concentration in the exhaust gas increases). The upper limit voltage of the application voltage sweep may be constant, but is set so as to increase as the lower limit voltage of the application voltage sweep increases. In the following, the lower limit voltage of the voltage range of the application voltage sweep is also referred to as "lower limit voltage (first voltage V1) of the application voltage sweep".

Specifically, the upper limit value of the application voltage Vm in the internal resistance dependent region R increases as the air-fuel ratio A/F of the engine becomes leaner. Thus, the first detection device is configured to increase the lower limit voltage (first voltage V1) of the application voltage sweep as the air-fuel ratio A/F of the engine becomes leaner so that the voltage range of the application voltage sweep does not enter the internal resistance dependent region R.

As a result of experiments carried out by the inventor(s) of the present application, when the A/F is 14.5 (stoichiometric), the first voltage V1 may be a value selected from a range equal to or more than 0.2 V, and the first detection device thus sets the first voltage V1 to 0.2 V. When A/F is 30, the first voltage V1 may be a value selected from a range equal to or more than 0.3 V, and the first detection device thus sets the first voltage V1 to 0.35 V.

As described above, when the voltage increase sweep and the voltage decrease sweep are performed, and SOx is contained in the exhaust gas, S (sulfur) generated as a result of the decomposition of SOx during the voltage increase sweep is adsorbed to the first electrode 41a. S adsorbed to the first electrode 41a is reoxidized during the voltage decrease sweep.

Figure 8:
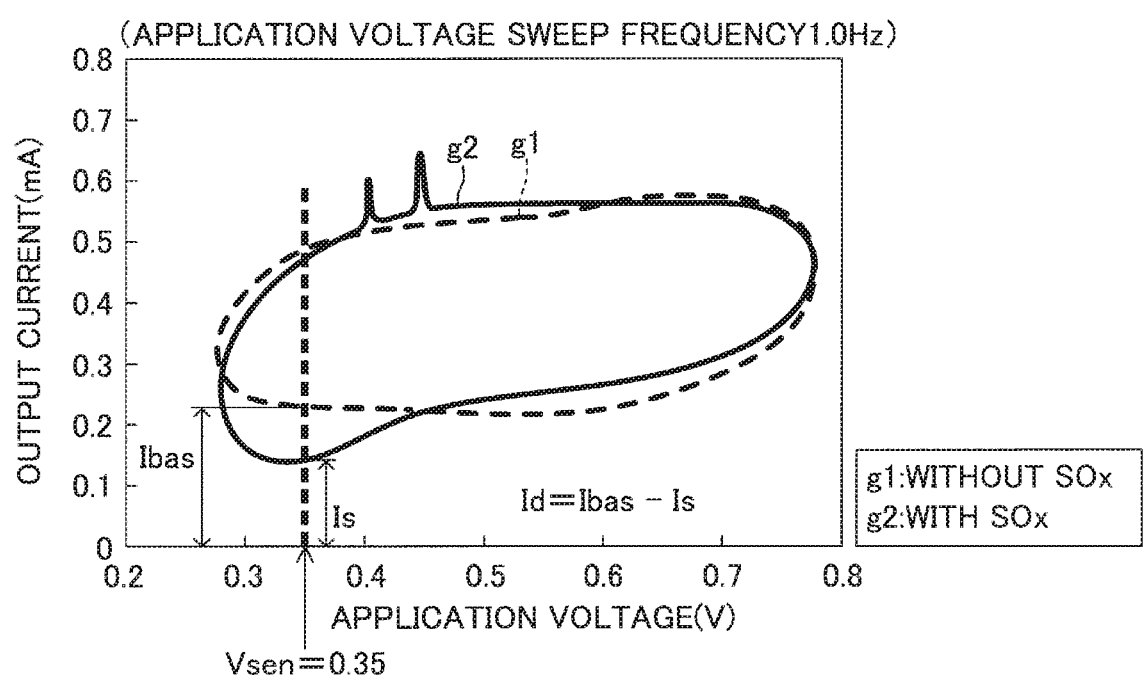
FIG. 8 is a graph for showing an example of a relationship between the application voltage and the output current exhibited when an application voltage sweep is performed.

The first detection device is configured to use the above-mentioned parameter (=difference Id) to detect the reoxidation current change, to thereby detect the SOx concentration. In other words, the first detection device is configured to acquire the output current Im (base current Ibas) at the reoxidation detection voltage Vsen during the voltage decrease sweep from the output current Im represented by a line g1 of FIG. 8, and store this base current Ibas in the ROM in advance. Further, the first detection device is configured to perform the application voltage sweep, to thereby acquire the output current Im (reoxidation current Is) at the reoxidation detection voltage Vsen during the voltage decrease sweep from the output current Im represented by a line g2 of FIG. 8. Further, the first detection device is configured to acquire the difference Id (=Ibas−Is: parameter representing the degree of the reoxidation current change) between the base current Ibas and the reoxidation current Is. The first detection device is configured to detect the SOx concentration (determine absence/presence of the SOx having a concentration equal to or more than the predetermined concentration in the exhaust gas) based on the difference Id (magnitude of the difference Id).

<Overview of Element Temperature Control of Gas Sensor>

Incidentally, as described above, as illustrated in FIG. 3A, when the time point t0, which is the time point at which the starting of the internal combustion engine 10 is started, is reached, the first detection device starts the control for the heater 71 so that the solid electrolyte body 41s is heated by the heater 71. Specifically, the first detection device is configured to perform energization control of the heater 71 through target impedance feedback. In other words, the first detection device is configured to perform control for an amount of energization to the heater 71 so that the element impedance acquired as temperature information matches a target impedance set in advance (see, for example, Japanese Patent Application Laid-open No. 2002-71633 and Japanese Patent Application Laid-open No. 2009-53108).

As a result, the solid electrolyte body 41s is heated to the predetermined temperature equal to or more than the temperature (hereinafter sometimes referred to as "activation temperature") at which the oxide ion conductivity appears. Then, the temperature control is performed so that the element part 40 maintains the predetermined temperature in the periods in which the air-fuel ratio A/F and the SOx concentration are detected.

Figure 9:
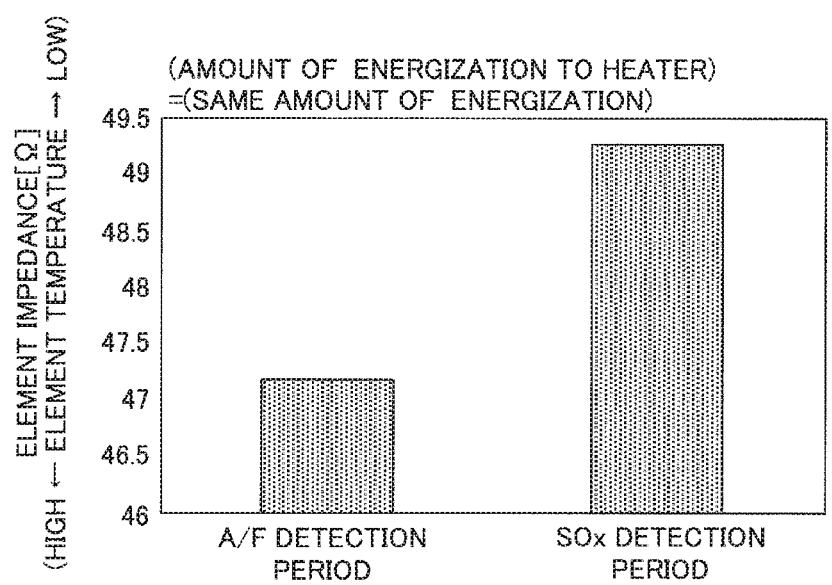
FIG. 9 is a graph for showing an element impedance in an air-fuel ratio A/F detection period and the element impedance in a SOx detection period exhibited when an amount of energization to a heater is the same.

Incidentally, a correspondence (sometimes referred to as "impedance-temperature characteristic") between the element impedance and the element temperature (temperature of the element part 40) is different between the periods in which the application voltage control for the air-fuel ratio A/F detection is performed (the period from the time point t1 to the time point immediately before the time point t2 and the period after the time point t3, and hereinafter sometimes referred to as "air-fuel ratio A/F detection period") and the period in which the application voltage control for the SOx detection is performed (the period from the time point t2 to the time point immediately before the time point t3, and hereinafter sometimes referred to as "SOx detection period"). Thus, as shown in FIG. 9, the element impedance corresponding to the same element temperature (same amount of energization to the heater) is different in the value between the air-fuel ratio A/F detection period and the SOx detection period.

A main reason for the difference between the "impedance-temperature characteristic" in the air-fuel ratio A/F detection period and the "impedance-temperature characteristic" in the SOx detection period is considered to be a difference in the application voltage control between the air-fuel ratio A/F detection period and the SOx detection period, and a mutual difference in the magnitude of the application voltage Vm applied in the respective periods. In other words, when the SOx concentration detection is performed, the application voltage sweep (application voltage control for the SOx detection) is performed between the first voltage V1 and the second voltage V2. In this application voltage sweep, the application voltage Vm increases to a voltage equal to or more than the decomposition start voltages of the oxygen and other oxygen-containing components (including SOx) other than the oxygen, and then decreases to a voltage less than those decomposition start voltages. As a result, when the application voltage control for the SOx detection is performed, in addition to a decomposition reaction of $O_2$, decomposition reactions of the other oxygen-containing components and the like, adsorption to the electrode, and detachment from the electrode occur on the electrode.

On the other hand, when the air-fuel ratio A/F is detected, the application voltage Vm is set to the "constant voltage (e.g., 0.3 V) less than the decomposition start voltages of the other oxygen-containing components and equal to or more than the oxygen decomposition start voltage". Therefore, the reactions of the other oxygen-containing components do not substantially occur on the electrode, and only the decomposition reaction of $O_2$ substantially occurs. Thus, the SOx detection period and the air-fuel ratio A/F detection period are different from each other in an electrode interface resistance, and the "impedance-temperature characteristic" in the air-fuel ratio A/F detection period and the "impedance-temperature characteristic" in the SOx detection period are thus different from each other.

Specifically, the amount of the decomposition components during the SOx detection period is larger than that during the air-fuel ratio A/F detection period, and hence the electrode interface resistance is large during the SOx detection period. As a result, the value of the element impedance corresponding to the same element temperature during the SOx detection period is larger than that during the air-fuel ratio A/F detection period. In other words, the element temperature corresponding to the same element impedance during the SOx detection period is larger than that during the air-fuel ratio A/F detection period.

Thus, when the target impedance of the SOx detection period (period in which the application voltage control for the SOx detection is performed) is set to be the same as the target impedance of the air-fuel ratio A/F detection period (period in which the application voltage control for the air-fuel ratio A/F detection is performed), the element temperature maintained to a constant temperature is displaced to the high temperature side (the desired temperature appropriate for the SOx detection cannot be maintained). Therefore, the detection precision of the SOx concentration decreases.

Thus, the first detection device is configured to acquire the "impedance-temperature characteristic (sometimes referred to as "first temperature characteristic")" in the air-fuel ratio A/F detection period and the "impedance-temperature characteristic (sometimes referred to as "second temperature characteristic")" in the SOx detection period in advance. As described above, the first temperature characteristic and the second temperature characteristic are different from each other. Thus, the first detection device is configured to set the target impedance in the air-fuel ratio A/F detection period and the target impedance in the SOx detection period to impedances corresponding to the same target temperature in accordance with those respective temperature characteristics.

Specifically, the first detection device is configured to set the target impedance in the air-fuel ratio A/F detection period to an impedance (first target impedance) corresponding to a first target temperature defined in accordance with the first temperature characteristic and the target impedance in the SOx detection period to an impedance (second target impedance) corresponding to the first target temperature defined in accordance with the second temperature characteristic.

Figure 10:
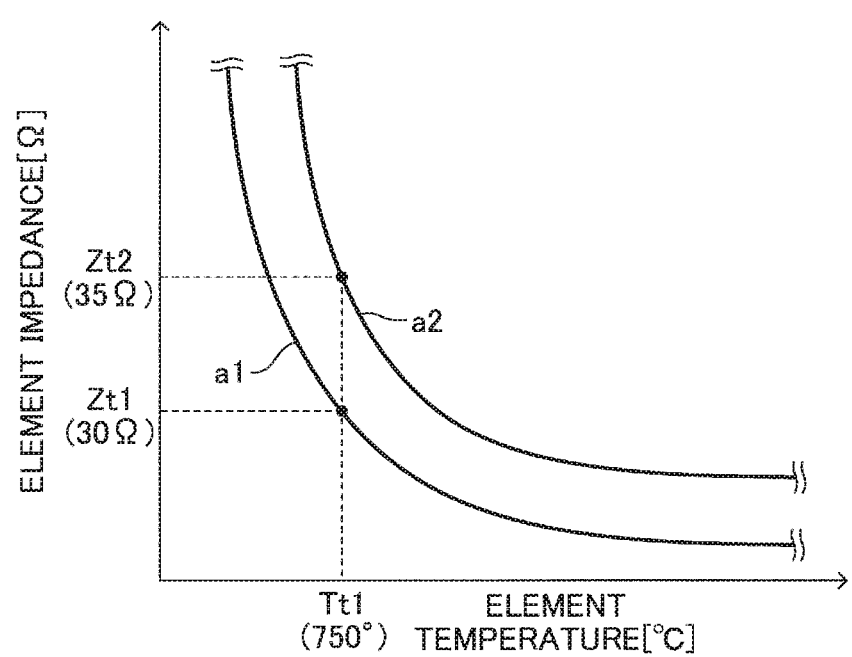
FIG. 10 is a graph for showing a relationship between the element impedance and an element temperature.

In other words, as shown in FIG. 10, the relationship (first temperature characteristic represented as a line a1) between the element temperature and the element impedance in the period of the air-fuel ratio A/F detection, and the relationship (second temperature characteristic represented as a line a2) between the element temperature and the element impedance in the period of the SOx detection are acquired through experiments or the like in advance, and the target impedances corresponding to the same target element temperature (for example, a first target temperature Tt1=750° C.) in accordance with the acquired relationships. Specifically, the first detection device is configured to set the target impedance in the air-fuel ratio A/F detection period to the first target impedance Zt1 (e.g., 30Ω), and set the target impedance in the SOx detection period to the second target impedance Zt2 (e.g., 35Ω), which is different from the first target impedance.

As a result, the first detection device can decrease likelihood of the change in element temperature in the SOx detection period from the first target temperature in the air-fuel ratio A/F detection period. As a result, the element temperature in the SOx detection period is maintained to the desired temperature (first target temperature) appropriate for the SOx concentration detection, and the SOx concentration detection can thus precisely be performed.

<Specific Operation>

A description is now given of a specific operation of the first detection device. A CPU (hereinafter simply referred to as "CPU") of the ECU 20 is configured to use the gas sensor 30 to execute each of routines illustrated as flowcharts of FIG. 11 to FIG. 13 each time a predetermined period elapses.

A value of each of flags used in those routines is set to "0" in an initial routine executed by the CPU when an ignition key switch (not shown) installed on the vehicle is changed from an off position to an on position.

Sensor activeness flag Xact: a sensor activeness flag Xact represents that the gas sensor 30 is in an "active state" when its value is "1". The sensor activeness flag Xact represents that the gas sensor 30 is not in the "active state" (in a sensor inactive state) when its value is "0".

Current acquisition completion flag Xa: a current acquisition completion flag Xa represents that the acquisition of the "reoxidation current Is" required to calculate the difference Id at the current time point has been completed when its value is "1". The current acquisition completion flag Xa represents that the acquisition of the "reoxidation current Is" has not been completed at the current time point when its value is "0".

Application voltage sweep execution flag Xsw: an application voltage sweep execution flag Xsw represents that the application voltage sweep (application voltage control for the SOx detection) is being performed at the current time point when its value is "1". The application voltage sweep execution flag Xsw represents that the application voltage sweep is not being performed at the current time point when its value is "0".

SOx concentration detection completion flag XSOx: a SOx concentration detection completion flag XSOx represents that the SOx concentration detection has been completed at the current time point when its value is "1". The SOx concentration detection completion flag XSOx represents that the SOx concentration detection has not been completed at the current time point when its value is "0".

Figure 11:
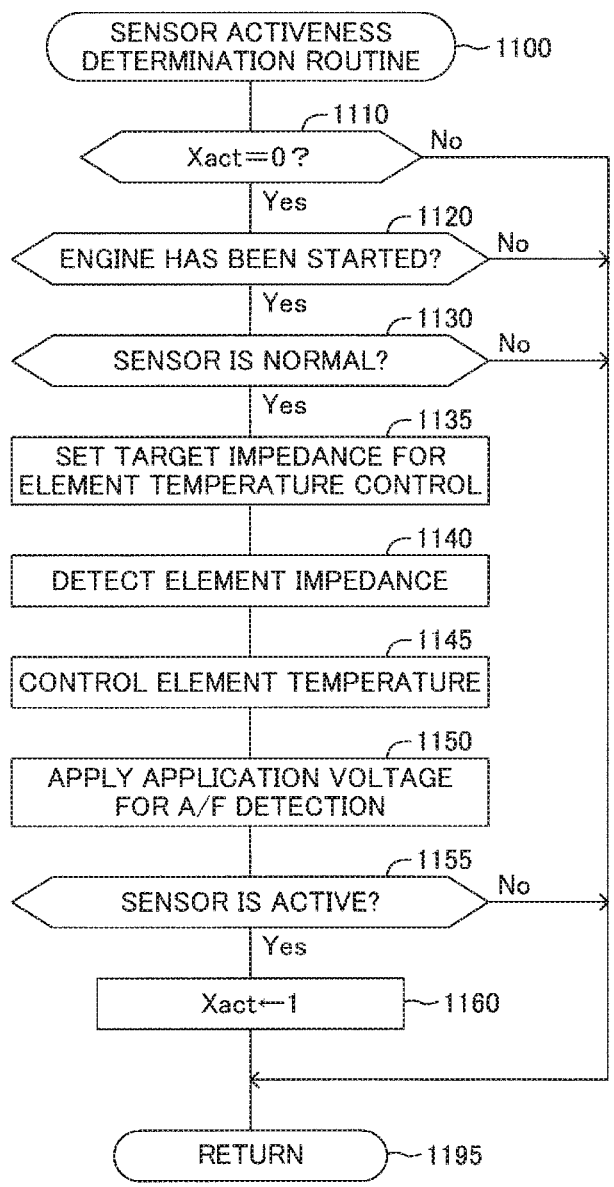
FIG. 11 is a flowchart for illustrating a sensor activity determination routine executed by a CPU of an ECU illustrated in FIG. 1.

The CPU starts processing from step 1100 of a sensor activeness determination routine illustrated in FIG. 11 at a predetermined timing, proceeds to step 1110, and determines whether or not the value of the sensor activeness flag Xact is "0".

When the current time point is immediately after the ignition key switch has changed to the on position, the value of the sensor activeness flag Xact is "0". In this case, the CPU makes a "Yes" determination at step 1110, proceeds to step 1120, and determines whether or not the engine has been started (the internal combustion engine 10 has been started).

When the engine has been started, the CPU makes a "Yes" determination at step 1120, proceeds to step 1130, and determines whether or not the gas sensor 30 is normal through a well known method. For example, when the operation state of the internal combustion engine 10 changes from a fuel injection state to a fuel cut state during the A/F detection (that is, while the application voltage Vm is being set to a voltage Vaf for the oxygen concentration detection) in a previous operation of the internal combustion engine 10, but the output current Im does not change, the CPU determines that the gas sensor 30 is abnormal, and stores this event in a backup RAM that can hold stored contents even when the ignition key switch is off. Then, the CPU determines whether or not the gas sensor 30 is normal based on the stored content in the backup RAM at step 1130 of the present routine.

When the gas sensor 30 is normal, the CPU makes a "Yes" determination at step 1130, sequentially performs step 1135 to step 1150, and then proceeds to step 1155.

Step 1135: the CPU sets the target impedance for the element temperature control to the first target impedance (target impedance for the A/F detection period (e.g., 30Ω corresponding to the first target temperature of 750° C.)) defined in accordance with the first temperature characteristic.

Step 1140: the CPU detects the element impedance (internal resistance of the solid electrolyte body 41s) for the element temperature control based on the output current Im when a voltage (e.g., a high frequency voltage) is applied between the first electrode 41a and the second electrode 41b (see, for example, Japanese Patent Application Laid-open No. Hei 10-232220 and Japanese Patent Application Laid-open No. 2002-71633).

Step 1145: the CPU performs the energization control of the heater 71 through the target impedance feedback. In other words, the CPU performs the control for the energization to the heater 71 so that the element impedance acquired as the temperature information at step 1140 matches the target impedance (first target impedance) set in advance at step 1135 (see, for example, Japanese Patent Application Laid-open No. 2002-71633 and Japanese Patent Application Laid-open No. 2009-53108).

Step 1150: the CPU applies the application voltage Vaf (specifically, 0.3 V) for the oxygen concentration detection (in other words, for the A/F detection) between the first electrode 41a and the second electrode 41b. In other words, the CPU sets the application voltage Vm to the application voltage Vaf for the oxygen concentration detection.

The CPU proceeds to step 1155, and determines whether or not the gas sensor 30 is active (whether or not the gas sensor 30 is sensor-active). Specifically, the CPU determines whether or not the element impedance acquired at step 1140 has a value less than a sensor activeness determination value. When the gas sensor 30 is not sensor-active, the CPU makes a "No" determination at step 1155 and proceeds to step 1195 to tentatively terminate the present routine.

In contrast, when the gas sensor 30 is sensor-active, the CPU makes a "Yes" determination at step 1155, proceeds to step 1160, and sets the value of the sensor activeness flag Xact to "1". Then, the CPU proceeds to step 1195 to tentatively terminate the present routine.

When the value of the sensor activeness flag Xact is not "0" at a time point when the CPU executes the processing of step 1110, the CPU makes a "No" determination at step 1110 and proceeds to step 1195 to tentatively terminate the present routine. Further, when the engine has not started at the time point when the CPU executes the processing of step 1120, the CPU makes a "No" determination at step 1120 and proceeds to step 1195 to tentatively terminate the present routine. Further, when the gas sensor 30 is not normal at the time point when the CPU executes the processing of step 1130, the CPU makes a "No" determination at step 1130 and proceeds to step 1195 to tentatively terminate the present routine.

Figure 12:
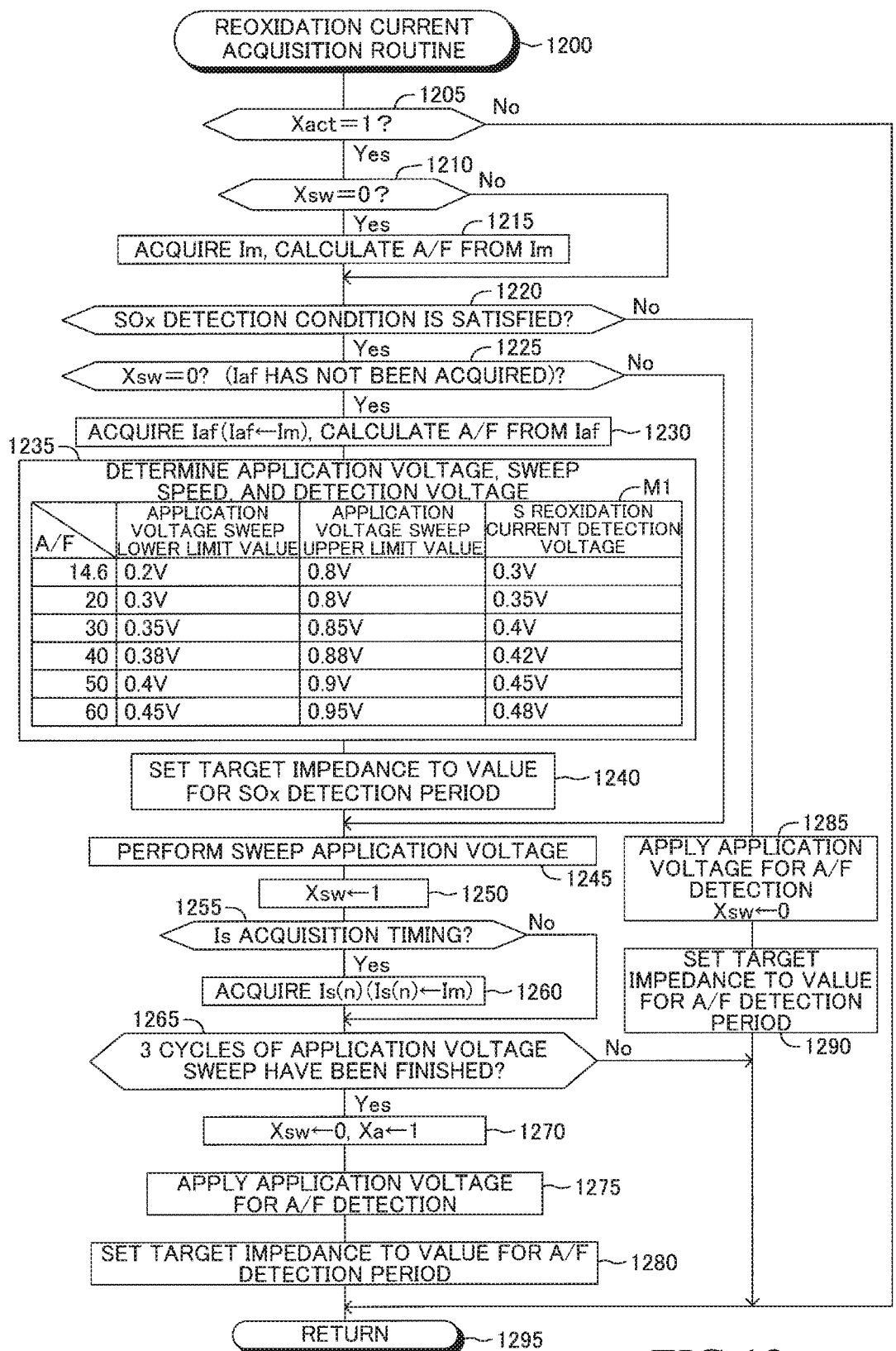
FIG. 12 is a flowchart for illustrating a reoxidation current acquisition routine executed by the CPU of the ECU illustrated in FIG. 1.

With reference to FIG. 12, a description is now given of a reoxidation current acquisition routine. The CPU starts processing from step 1200 of FIG. 12 at a predetermined timing, proceeds to step 1205, and determines whether or not the value of the sensor activeness flag Xact is "0".

The reoxidation current acquisition routine substantially functions after the gas sensor 30 becomes sensor-active, and the value of the sensor activeness flag Xact is set to "1".

Thus, when the value of the sensor activeness flag Xact is not "1" (in other words, when the value of the sensor activeness flag Xact is "0"), the CPU makes a "No" determination at step 1205 and proceeds to step 1295 to tentatively terminate the present routine.

In contrast, when the value of the sensor activeness flag Xact is set to "1" through the processing of step 1160 of FIG. 11, the CPU makes a "Yes" determination at step 1205, proceeds to step 1210, and determines whether or not the value of the application voltage sweep execution flag Xsw representing whether or not the application voltage sweep is being performed is "0".

When the value of the application voltage sweep execution flag Xsw is 0, the CPU makes a "Yes" determination at step 1210, proceeds to step 1215, detects the oxygen concentration based on the output current Im acquired from the gas sensor 30, applies the oxygen concentration to a predetermined lookup table (also referred to as "map"), to thereby calculate the air-fuel ratio A/F of the engine, and then proceeds to step 1220. When the time point of the execution of the processing of step 1210 is after the start of the execution of the application voltage sweep, and the value of the application voltage sweep execution flag Xsw is "1" (see step 1250 described later), the CPU makes a "No" determination at step 1210, and directly proceeds to step 1220.

When the CPU proceeds to step 1220, the CPU determines whether or not all the following conditions constituting SOx detection condition are satisfied based on the information acquired from various sensors (for example, the NE sensor 21, the water temperature sensor 22). When all the following conditions are satisfied, the SOx detection condition is satisfied.

<<SOx Detection Condition>>

The internal combustion engine 10 is in a state after the warming (in other words, the coolant temperature THW is equal to or more than a warmed water temperature THWth).

The gas sensor 30 is sensor-active.

The state is not the fuel cut state.

The air-fuel ratio A/F of the engine is stable. In other words, the operation state of the internal combustion engine 10 is in an idling state, or the operation state of the vehicle is a steady travel state. Whether or not the operation state of the internal combustion engine 10 is in the idling state is determined by determining whether or not a "state in which the accelerator pedal operation amount AP is '0', and the engine rotation speed NE is equal to or less than a predetermined RPM" has continued for a period equal to or more than a predetermined idling period. Whether or not the operation state of the vehicle is in the steady travel state is determined by determining whether or not a "state in which a change amount per unit period of the accelerator pedal operation amount AP is equal to or less than a threshold operation change amount, and a change amount of the speed of the vehicle per unit period is equal to or less than a threshold vehicle speed change amount" has continued for a period equal to or more than a predetermined steady travel threshold period.

The SOx concentration detection is not performed once (the value of the SOx concentration detection completion flag XSOx is not "1") before the ignition key switch is changed to the off position after a change from the off position to the on position (in other words, after the start of the internal combustion engine 10 for the current time).

When the SOx detection condition is satisfied, the CPU makes a "Yes" determination at step 1220, proceeds to step 1225, and determines whether or not the value of the application voltage sweep execution flag Xsw is "0". As described later, when the value of the application voltage sweep execution flag Xsw is "1", the output current Iaf (used for the A/F detection) immediately before the application voltage sweep has already been acquired (see step 1230 and step 1250). Thus, when the value of the application voltage sweep execution flag Xsw is "0", the output current Iaf immediately before the application voltage sweep has not been acquired yet.

Thus, when the value of the application voltage sweep execution flag Xsw is "0", the CPU makes a "Yes" determination at step 1225, proceeds to step 1230, acquires the output current Im at this time point as the output current Iaf (output current Im when the application voltage Vm is the voltage Vaf for the oxygen concentration detection), detects the oxygen concentration based on the acquired output current Iaf, and applies the oxygen concentration to a predetermined lookup table, to thereby calculate the air-fuel ratio A/F of the engine.

Then, the CPU proceeds to step 1235, and applies the air-fuel ratio A/F calculated based on the acquired output current Iaf to a lookup table M1, to thereby determine the sweep voltage range (the lower limit voltage (first voltage V1) and the upper limit voltage (second voltage V2)) of the application voltage sweep and the reoxidation current detection voltage Vsen. Then, the CPU proceeds to step 1240, and sets the target impedance for the element temperature control to the second target impedance defined in accordance with the second temperature characteristic (target impedance in the SOx detection period (e.g., 35Ω corresponding to the element temperature 750° C.)). In other words, the CPU changes the target impedance for the element temperature control from the first target impedance to the second target impedance.

In contrast, when the value of the application voltage sweep execution flag Xsw is not "0" at the time point when the CPU executes the processing of step 1225, the CPU makes a "No" determination at step 1225, and directly proceeds to step 1245.

When the CPU proceeds to step 1245, the CPU performs the application voltage sweep at the sweep voltage range determined at step 1235 and the predetermined application voltage sweep speed (cycle=1 second). In other words, the CPU performs processing of applying the voltage of the sinusoidal wave for the three cycles under the sweep condition. When the application voltage sweep has already been performed at the time point of step 1245, the CPU continues the execution of the application voltage sweep.

Then, the CPU proceeds to step 1250, and sets the value of the application voltage sweep execution flag Xsw to "1". Then, the CPU proceeds to step 1255, and determines whether or not the current time point is acquisition timing for the reoxidation current Is. Specifically, the CPU determines whether or not the current time point is during the voltage decrease sweep of each cycle out of the three cycles of the voltage application sweep, and the application voltage Vm matches the reoxidation current detection voltage Vsen. When the current time point is the acquisition timing for the reoxidation current Is, the CPU makes a "Yes" determination at step 1255, proceeds to step 1260, acquires the output current Im at this time point as a reoxidation current Is(n), and stores the reoxidation current Is(n) in the RAM. Then, the CPU proceeds to step 1265.

In contrast, at the time point when the CPU executes the processing of step 1255, when the time point is not the acquisition timing for the reoxidation current Is, the CPU makes a "No" determination at step 1255, and directly proceeds to step 1265.

When the CPU proceeds to step 1265, the CPU determines whether or not the three cycles of the application voltage sweep have been finished.

When the three cycles of the application voltage sweep have not been finished, the CPU makes a "No" determination at step 1265 and directly proceeds to step 1295 to tentatively terminate the present routine. In contrast, when the three cycles of the application voltage sweep have been finished, the CPU makes a "Yes" determination at step 1265, performs processing from step 1270 to step 1280 described later, proceeds to step 1295, and tentatively terminates the present routine.

Step 1270: the CPU sets (clears) the value of the application voltage sweep execution flag Xsw to "0", and simultaneously sets the value of the current acquisition completion flag Xa to "1".

Step 1275: the CPU sets the application voltage Vm to the application voltage Vaf for the oxygen concentration detection.

Step 1280: the CPU sets the target impedance for the element temperature control to the first target impedance (target impedance in the A/F detection period) defined in accordance with the first temperature characteristic. In other words, the CPU changes the target impedance for the element temperature control from the second target impedance to the first target impedance.

When the SOx detection condition is not satisfied at a time point when the CPU executes the processing of step 1220, the CPU makes a "No" determination at step 1220, proceeds to step 1285, sets the application voltage Vm to the application voltage Vaf for the oxygen concentration detection, and sets (clears) the value of the application voltage sweep execution flag Xsw to "0". Then, the CPU proceeds to step 1290, and sets the target impedance for the element temperature control to the first target impedance (target impedance in the A/F detection period) defined in accordance with the first temperature characteristic. In other words, the CPU changes the target impedance for the element temperature control from the second target impedance to the first target impedance. When the target impedance for the element temperature control is the first target impedance at the time point of the processing at step 1285, the CPU maintains the target impedance for the element temperature control to be set to the first target impedance. Then, the CPU proceeds to step 1295 to tentatively terminate the present routine.

As a result of the execution of this routine of FIG. 12, the reoxidation currents Is(1), Is(2), and Is(3) of the respective cycles of the three cycles of the application voltage sweep are acquired, and stored in the RAM.

Figure 13:
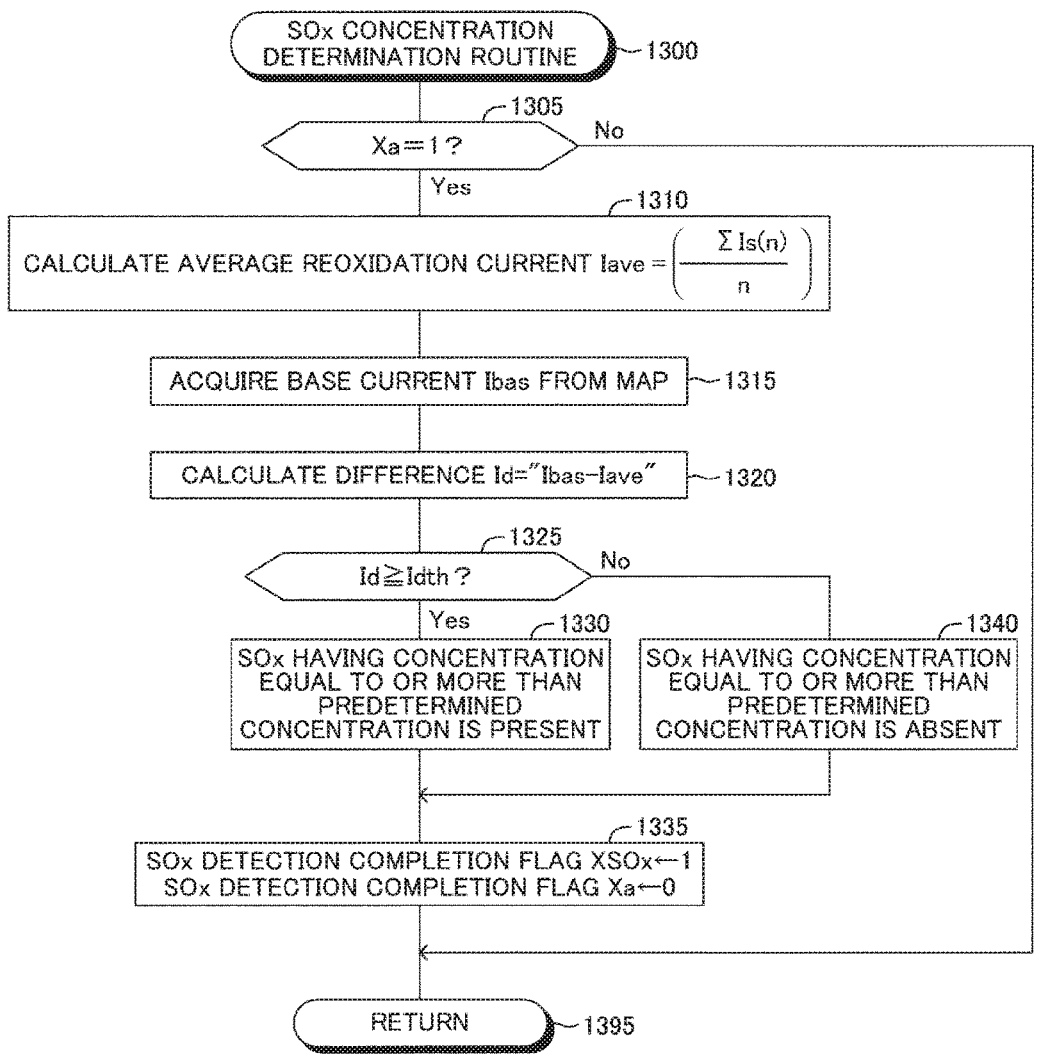
FIG. 13 is a flowchart for illustrating a SOx concentration determination routine executed by the CPU of the ECU illustrated in FIG. 1.

With reference to FIG. 13, a description is now given of a SOx concentration determination routine. The CPU starts processing from step 1300 of FIG. 13 at a predetermined timing, proceeds to step 1305, and determines whether or not the value of the current acquisition completion flag Xa is "1".

The SOx concentration determination routine substantially functions when the value of the current acquisition completion flag Xa is "1". Thus, when the value of the current acquisition completion flag Xa is not "1", the CPU makes a "No" determination at step 1305 and proceeds to step 1395 to tentatively terminate the present routine.

In contrast, when the value of the current acquisition completion flag Xa is set to "1" by the processing of step 1270 of FIG. 12, the CPU makes a "Yes" determination at step 1305, sequentially performs processing from step 1310 to step 1320 described below, and proceeds to step 1325.

Step 1310: the CPU calculates the average value (average reoxidation current Iave) of the acquired reoxidation currents Is(1), Is(2), and Is(3).

Step 1315: the CPU applies the sweep voltage range (the lower limit voltage (first voltage V1) and the upper limit voltage (second voltage V2)) of the application voltage sweep for the current time to a lookup table MapBse (not shown), to thereby acquire the base current Ibas and a threshold difference Idth. On this occasion, the CPU may apply the air-fuel ratio A/F of the engine acquired at step 1230 to the lookup table MapBse. The base current Ibas is the output current Im at the reoxidation current detection voltage Vsen when the application voltage sweep is performed at this A/F and in this voltage range for the exhaust gas not containing SOx as the gas to be detected as described above. The threshold difference Idth has a value appropriate for determining whether or not SOx having a concentration equal to or more than the predetermined concentration is contained in the exhaust gas, and identified by experiments performed in advance or the like. In other words, the difference Id when sulfur (S) at an upper limit concentration in the permissible range is mixed with the fuel, and the voltage application sweep is performed under the same condition (condition for actually detecting the SOx concentration in the exhaust gas) as described above is set to the threshold difference Idth. The same condition in this case means that the voltage waveform of the application voltage sweep, the application voltage range of the application voltage sweep, the sweep speed of the application voltage sweep, the air-fuel ratio of the engine, and the like are the same.

Step 1320: the CPU calculates the difference Id="Ibas−Iave". The difference Id has a value equal to or more than 0, and the "difference Id" and the "magnitude of the difference Id" are equal to each other.

The CPU proceeds to step 1325, and determines whether or not the calculated difference Id (thus, the magnitude of the difference Id) is equal to or more than the threshold difference Idth. When the difference Id is equal to or more than the threshold difference Idth, the CPU makes a "Yes" determination at step 1325, proceeds to step 1330, and determines that SOx having a concentration equal to or more than the predetermined concentration (upper limit concentration exhibited when the threshold difference Idth is determined) is contained in the exhaust gas. On this occasion, the CPU may store the state in which SOx having a concentration equal to or more than the predetermined concentration is contained in the exhaust gas (or a state in which S having an amount exceeding a permitted value is mixed with the fuel) in the backup RAM, and may turn on a predetermined warning lamp. Then, the CPU proceeds to step 1335, and sets the value of the SOx detection completion flag XSOx to "1". Then, the CPU proceeds to step 1395 to tentatively terminate the present routine.

In contrast, when the SOx detection parameter Id is not equal to or more than the threshold difference Idth (in other words, when the SOx detection parameter Id is less than the threshold difference Idth), the CPU makes a "No" determination at step 1325, proceeds to step 1340, and determines that the SOx having a concentration equal to or more than the predetermined concentration is not contained in the exhaust gas. On this occasion, the CPU may store the state in which SOx having a concentration equal to or more than the predetermined concentration is not contained in the exhaust gas (or a state in which S having an amount exceeding the permitted value is not mixed with the fuel) in the backup RAM, and may turn off the predetermined warning lamp. Then, the CPU proceeds to step 1335, and sets the value of the SOx detection completion flag XSOx to "1". Then, the CPU proceeds to step 1395 to tentatively terminate the present routine.

As described above, the first detection device sets the target impedance for the element control in the A/F detection period to the first target impedance corresponding to the first target temperature defined in accordance with the first temperature characteristic. The first detection device sets the target impedance for the element control in the SOx detection period to the second target impedance corresponding to the first target temperature defined in accordance with the second temperature characteristic. As a result, such likelihood that the element temperature in the SOx detection period changes from the first target temperature in the air-fuel ratio A/F detection period can be decreased, and is maintained to the desired temperature (first target temperature) appropriate for the SOx concentration detection. As a result, the SOx concentration detection can precisely be performed.

First Modification Example

A description is now given of the gas detection device (hereinafter sometimes referred to as "first modification example detection device") according to a first modification example of the present disclosure.

The first detection device is configured to compare the magnitude of the difference Id and the threshold difference Idth with each other, to thereby determine whether or not SOx having a concentration equal to or more than the predetermined concentration is contained in the exhaust air. In contrast, the first modification example detection device may be configured to acquire the SOx concentration in the exhaust gas based on the difference Id as described below.

Figure 14:
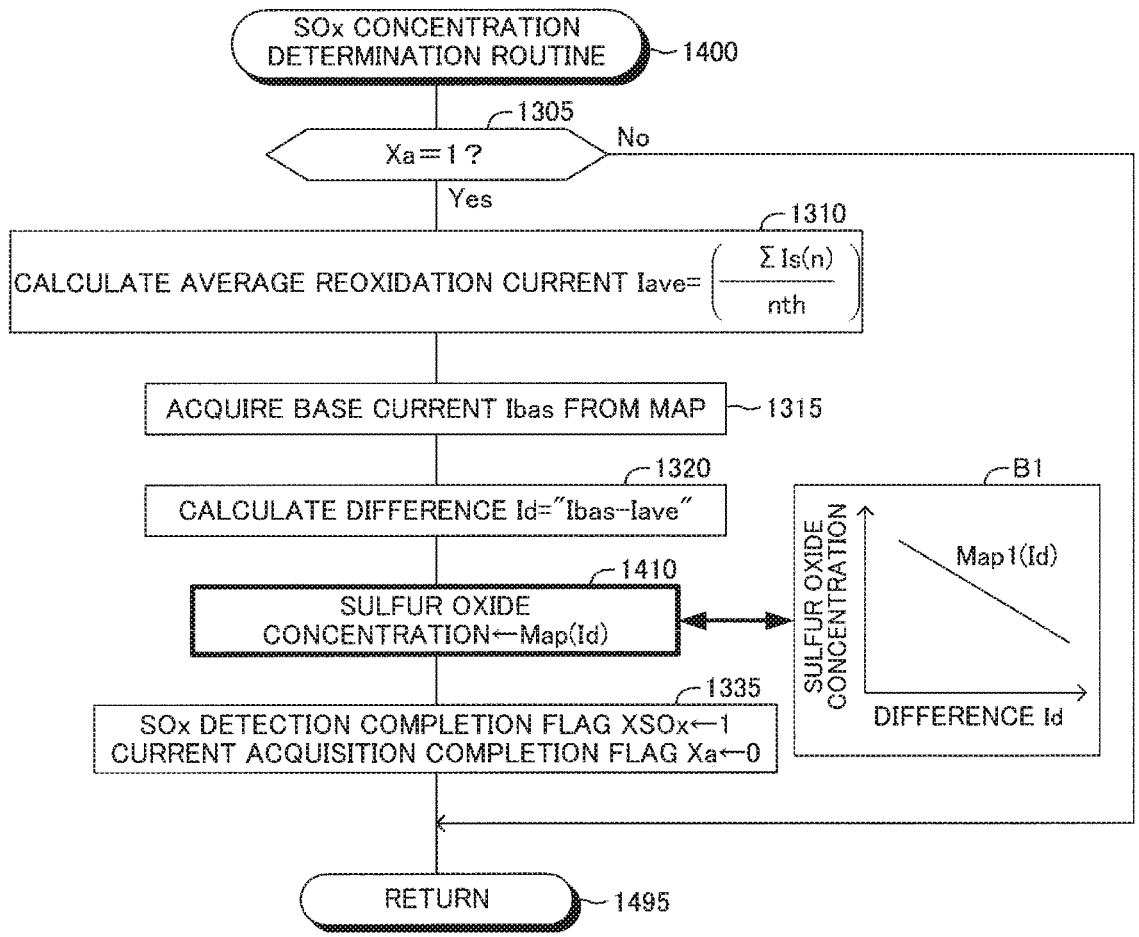
FIG. 14 is a flowchart for illustrating a SOx concentration determination routine executed by the CPU of the ECU illustrated in FIG. 1.

For example, the CPU may be configured so as to execute a SOx concentration determination routine illustrated in FIG. 14 in place of the SOx concentration determination routine illustrated in FIG. 13. The routine illustrated in FIG. 14 is a routine in which "processing of step 1410" is executed in place of the processing of "step 1325, step 1330, and step 1340" illustrated in FIG. 14. Thus, a description is mainly given of the processing of "step 1410" of FIG. 14.

The CPU calculates the difference Id at step 1320 of FIG. 14, proceeds to step 1410, and applies the difference Id to a lookup table Map1(Id), to thereby acquire the SOx concentration in the exhaust gas. The ROM (storage part) of the ECU 20 stores the "relationship between the difference Id and the SOx concentration in the exhaust gas" as the lookup table Map1(Id) (see a block B1 of FIG. 14). This lookup table can be acquired by carrying out experiments or the like in advance.

The first modification example detection device can provide the same effect as that of the first detection device. Further, the first modification example detection device is configured to use the difference Id as the parameter representing the degree of the reoxidation current change that is less likely to be influenced by the oxygen-containing components other than SOx to acquire the concentration of SOx contained in the exhaust gas corresponding to the difference Id through a lookup table MapND stored in the ROM. Thus, the concentration of the sulfur oxide in the exhaust gas can precisely be detected.

Second Embodiment

A description is now given of a gas detection device (hereinafter sometimes referred to as "second detection device") according to a second embodiment of the present disclosure. The second detection device is different from the first detection device only in the following point.

The second target impedance is determined based on the air-fuel ratio A/F of the engine when the target impedance of the element temperature control is set to the second target impedance (target impedance in the SOx detection period).

A description is now mainly given of this different point
<Overview of Operation>

The first temperature characteristic and the second temperature characteristic change in accordance with the air-fuel ratio of the engine. In other words, the first temperature characteristic and the second temperature characteristic change so that the element impedance corresponding to the same element temperature increases as the air-fuel ratio of the engine becomes leaner. A reason for the change in the temperature characteristics can be considered that the concentration of the water in the exhaust gas decreases as the air-fuel ratio A/F of the engine becomes leaner, and an output current change caused by the decomposition of $H_2O$ thus decreases (oxygen ion resulting from $H_2O$ decreases), resulting in an increase in electrode interface resistance, which influences the element impedance.

Figure 15:
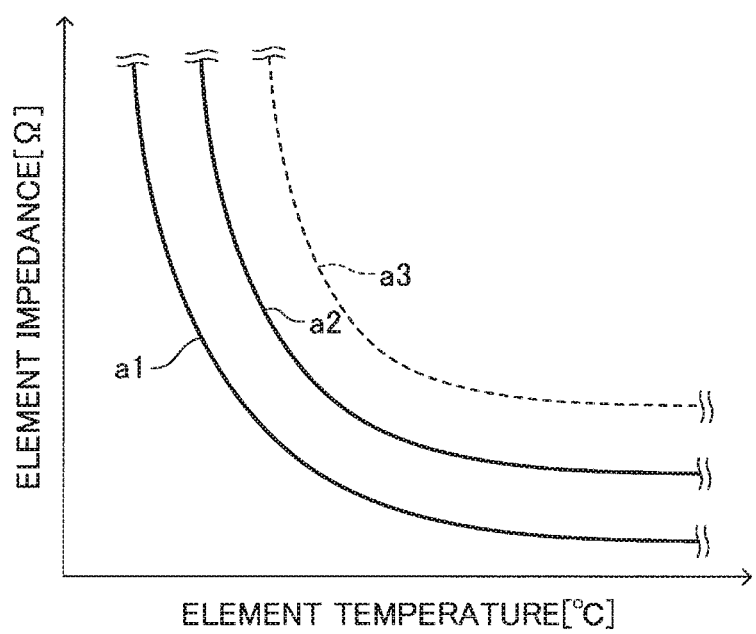
FIG. 15 is a graph for showing a relationship between the element impedance and the element temperature.

Thus, depending on the magnitude of the air-fuel ratio A/F of the engine, influence on the first temperature characteristic in the A/F detection period in which the decomposition of $H_2O$ does not substantially occur is small, but influence on the second temperature characteristic in the SOx detection period in which the decomposition of $H_2O$ occurs is large. Thus, as shown in FIG. 15, in a case where the air-fuel ratio of the engine is more than the air-fuel ratio of the engine when the second temperature characteristic represented as the line a2 is acquired, the temperature characteristic is a temperature characteristic represented as a line a3 that is more in the element impedance than the second temperature characteristic represented as the line a2 for an arbitrary element temperature.

Thus, the second detection device is configured to acquire the air-fuel ratio A/F of the engine before (e.g., immediately before) the SOx detection period in preparation for the SOx detection period. The second detection device is configured to determine the second target impedance based on the acquired air-fuel ratio A/F of the engine, and control the amount of energization to the heater based on the determined second target impedance. As the second target impedance, an impedance (referred to as "corrected second target impedance") corresponding to the first target temperature defined in accordance with a corrected second temperature characteristic, which is acquired by correcting the second temperature characteristic, is determined. The corrected second temperature characteristic is a temperature characteristic acquired by correcting the second temperature characteristic acquired at a predetermined air-fuel ratio A/F so that the element impedance corresponding to an arbitrary element temperature increases as the air-fuel ratio A/F increases from the predetermined air-fuel ratio A/F.

The second detection device is configured to control the amount of energization to the heater so that the element impedance matches the corrected second target impedance corresponding to the first target temperature defined in accordance with the corrected second temperature characteristic in the SOx detection period. Consequently, such likelihood that the element temperature in the SOx detection period changes from the first target temperature in the air-fuel ratio A/F detection period can be decreased, and is maintained to the desired temperature appropriate for the SOx concentration detection. As a result, the SOx concentration detection can precisely be performed.

<Specific Operation>

A description is now given of a specific operation of the second detection device. The CPU of the ECU 20 is configured to use the gas sensor 30 to execute each of routines illustrated in flowcharts of FIG. 11, FIG. 13, and FIG. 16 each time a predetermined period elapses. Operations based on the routines illustrated in FIG. 11 and FIG. 13 are the same as the operations based on those routines of the first detection device, and have already been described. Therefore, a description thereof is thus omitted.

Figure 16:
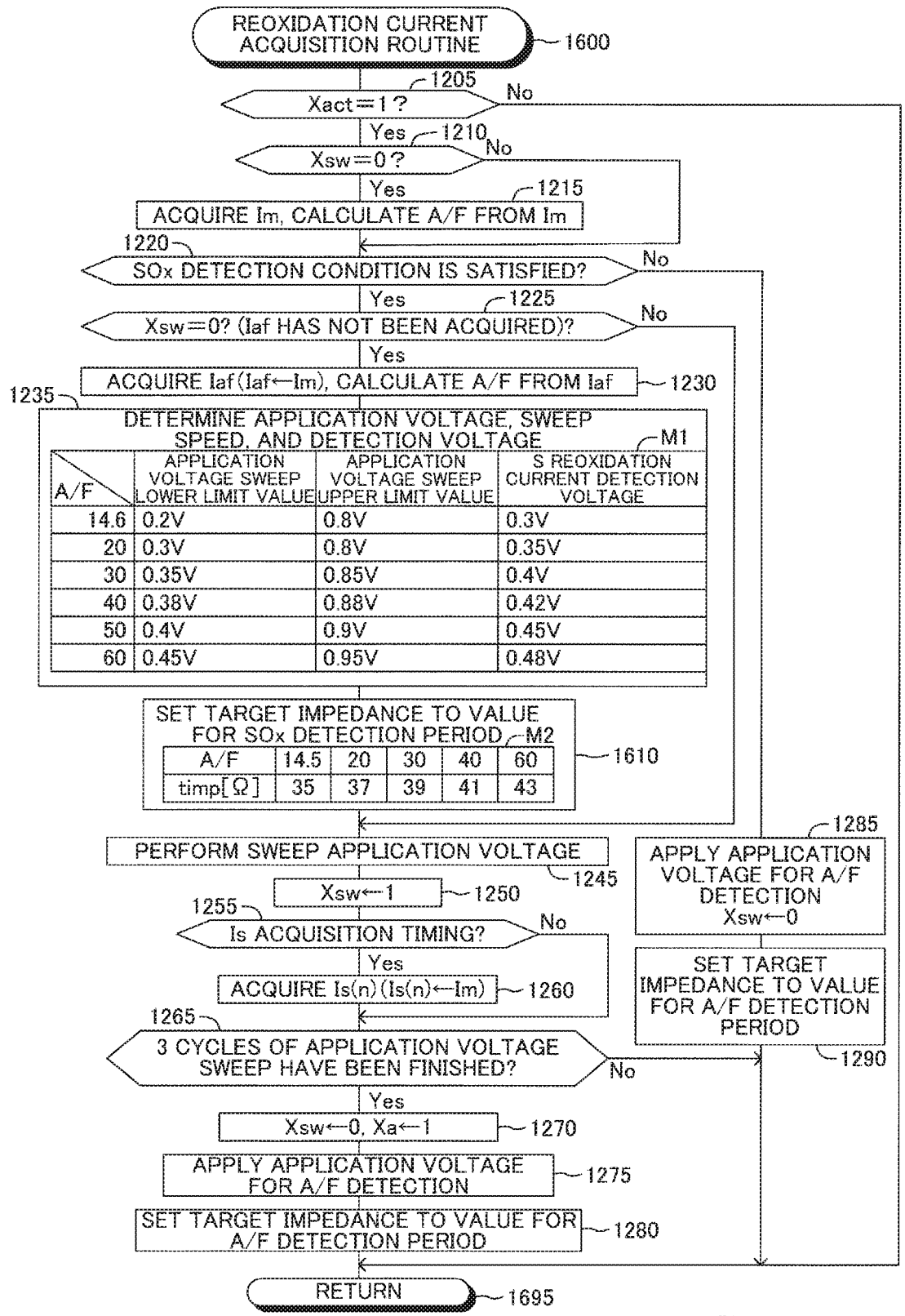
FIG. 16 is a flowchart for illustrating a reoxidation current acquisition routine executed by the CPU of the ECU provided for the gas detection device according to a second embodiment of the present disclosure.

With reference to FIG. 16, a description is now given of an operation of the second detection device. A routine of FIG. 16 is different from the routine of FIG. 12 only in such a point that step 1240 of FIG. 12 is replaced by step 1610.

step 1610: the value (corrected second target impedance) of the target impedance corresponding to the first target temperature is determined by applying the air-fuel ratio A/F calculated based on the output current Iaf acquired at step 1230 to a lookup table map M2, and the determined value is set as the target impedance. The ROM of the ECU 20 stores the relationship between the "A/F and the corrected second target impedance corresponding to the first target temperature defined in accordance with the corrected second temperature characteristic" as the lookup table M2. This lookup table M2 can be acquired by performing experiments or the like in advance.

In place of step 1610, the following processing may be executed. In other words, the target impedance corresponding to the first target temperature defined in accordance with the second temperature characteristic acquired at a predetermined reference air-fuel ratio A/F (e.g., 14.5) may be corrected based on the air-fuel ratio A/F acquired at step 1230, and the corrected value (corrected second target impedance) may be set as the target impedance. In this case, when the acquired air-fuel ratio A/F is more than the reference air-fuel ratio A/F, the corrected second target impedance value may be corrected so as to increase as the difference from the reference air-fuel ratio A/F increases. When the acquired air-fuel ratio A/F is less than the reference air-fuel ratio A/F, the corrected second target impedance value may be corrected so as to decrease as the difference from the reference air-fuel ratio A/F increases.

As described above, the second detection device sets the target impedance for the element control in the A/F detection period to the first target impedance corresponding to the first target temperature defined in accordance with the first temperature characteristic. The second detection device sets the target impedance for the element control in the SOx detection period to the corrected second target impedance corresponding to the first target temperature defined in accordance with the corrected second temperature characteristic in which the air-fuel ratio A/F of the engine is taken into account. As a result, such likelihood that the element temperature in the SOx detection period changes from the first target temperature in the air-fuel ratio A/F detection period can be decreased, and is maintained to the desired temperature (first target temperature) appropriate for the SOx detection. As a result, the SOx concentration detection can precisely be performed.

Second Modification Example

A description is now given of the gas detection device (hereinafter sometimes referred to as "second modification example detection device") according to a second modification example of the present disclosure.

The second detection device is configured to compare the magnitude of the difference Id and the threshold difference Idth with each other, to thereby determine whether or not SOx having a concentration equal to or more than the predetermined concentration is contained in the exhaust air. In contrast, the second modification example detection device may be configured to acquire the SOx concentration in the exhaust gas based on the difference Id as described below.

For example, the CPU may be configured so as to execute the SOx concentration determination routine illustrated in FIG. 14 in place of the SOx concentration determination routine illustrated in FIG. 13. This routine illustrated in FIG. 14 has already been described. Therefore, a description thereof is thus omitted.

As described above, the second modification example detection device can provide the same effect as that of the second detection device. Further, the second modification-example device is configured to use the difference Id as the parameter representing the degree of the reoxidation current change that is less likely to be influenced by the oxygen-containing components other than SOx contained in the exhaust gas to acquire the concentration of SOx contained in the exhaust gas corresponding to the difference Id through the lookup table MapND stored in the ROM. Thus, the concentration of the sulfur oxide in the exhaust gas can precisely be detected.

Other Modification Examples

A description has been given of the respective embodiments of the present disclosure, but the present disclosure is not limited to the respective embodiments, and various modification examples based on the technical idea of the present disclosure may be employed.

Each of the embodiments and the modification examples described above acquires, in advance, the "impedance-temperature characteristic (first temperature characteristic)" in the air-fuel ratio A/F detection period and the "impedance-temperature characteristic (second temperature characteristic or the corrected second temperature characteristic)" in the SOx detection period. Then, the first target impedance in the air-fuel ratio A/F detection period and the second target impedance in the SOx detection period are set to the values corresponding to the first target temperature based on the respective characteristics.

In contrast, each of the embodiments and the modification examples described above may set the second target impedance in the SOx detection period to a target impedance corresponding to a second target temperature different from the first target temperature in the A/F detection period so that the element temperature is more appropriate for the SOx detection in the SOx detection period.

As a result, the element temperature is maintained to the temperature (second target temperature) at which the output current change corresponding to the SOx concentration more significantly appears, and the SOx concentration detection can more precisely be performed in the SOx detection period.

For example, the first target impedance in the A/F detection period may be set to a value (e.g., 30Ω) corresponding to the first target temperature (e.g., 750° C.), and the second target impedance in the SOx detection period may be set to a value (e.g., 45Ω) corresponding to the second target temperature (e.g., 700° C.) less than the first target temperature. In this case, the amount of the sulfur adsorbed to the electrode tends to increase, and the output of the reoxidation current tends to increase. Therefore, the SOx concentration detection can more precisely be performed.

The first target impedance in the A/F detection period may be set to a value (e.g., 30Ω) corresponding to the first target temperature (e.g., 750° C.), and the second target impedance in the SOx detection period may be set to a value corresponding to the second target temperature more than the first target temperature. In this case, the reoxidation reaction tends to smoothly progress, and the output of the reoxidation current tends to increase. Therefore, the SOx concentration detection can more precisely be performed.

Each of the respective embodiments and the modification examples described above may acquire the element temperature corresponding to the detected element impedance based on each acquired "impedance-temperature characteristic", and may use the acquired element temperature to perform feedback control for the amount of energization to the heater 71 so that the acquired element temperature matches the target temperature (the first target temperature or the second target temperature).

The reoxidation current Is is not limited to the "output current Im" when the application voltage "becomes the reoxidation current detection voltage Vsen, which is the voltage less than the decomposition start voltage of SOx", and each of the respective embodiments and the modification examples described above may acquire a value as long as the value correlates with the output current Im in the period in which the voltage decrease sweep is performed, and the application voltage Vm is less than the decomposition start voltage of SOx. For example, each of the embodiments may acquire, as the reoxidation current Is, the minimum value of the output current Im in the period in which the application voltage Vm is within the detection voltage range during the voltage decrease sweep. In this case, the detection voltage range is a range equal to or more than a predetermined voltage more than the lower limit voltage (first voltage V1) of the voltage decrease sweep and equal to or less than a predetermined voltage equal to or less than the decomposition start voltage (0.6 V) of SOx.

The "parameter for detecting the reoxidation current change" is not limited to the difference Id described above, and each of the respective embodiments described above may acquire a value as long as the value correlates with the output current Im in the period in which the voltage decrease sweep is being performed, and the application voltage Vm is within the detection voltage range may be acquired.

Further, for example, the voltage waveform of the application voltage sweep is not limited to the waveforms shown in FIG. 3B and FIG. 3C, but may be an arbitrary waveform (e.g., triangular wave) as long as the voltage continuously change, and simultaneously, the voltage decrease sweep is performed at such a voltage decrease speed that the reoxidation current change caused by the reoxidation of the sulfur adsorbed to the first electrode 41a becomes extremely conspicuous from a certain time point during the voltage decrease sweep of the application voltage sweep.

What is claimed is:
1. A gas detection device, comprising:
an element part, which is provided in an exhaust passage of an internal combustion engine, said element part comprising an electrochemical cell comprising a solid electrolyte body having oxide ion conductivity and a first electrode and a second electrode formed on respective surfaces of said solid electrolyte body, and a diffusion resistance body made of a porous material through which exhaust gas flowing through said exhaust passage is allowed to pass, said element part being configured so that said exhaust gas flowing through said exhaust passage reaches said first electrode through said diffusion resistance body;
a heater configured to generate heat when a current is supplied, to thereby heat said element part;
a power supply circuit configured to apply a voltage between said first electrode and said second electrode;
an ammeter configured to detect an output current, which is a current flowing between said first electrode and said second electrode; and an electronic control unit including a memory including instructions, the instructions, when executed by a processor of the electronic control unit, causing the electronic control unit to:

detect an impedance of said element part based on the current and the voltage;

control an amount of energization to said heater based on said detected impedance of said element part, to thereby control a temperature of said element part;

control an application voltage with the power supply circuit, which is said voltage applied between said first electrode and said second electrode, acquire said output current by using the ammeter, and perform one of determination of whether or not sulfur oxide having a concentration equal to or more than a predetermined concentration is contained in said exhaust gas and detection of said concentration of said sulfur oxide in said exhaust gas;

perform, with said power supply circuit, application voltage control for air-fuel ratio detection of setting said application voltage to a voltage that brings said output current to a limiting current of oxygen, to thereby detect an air-fuel ratio of mixture supplied to said internal combustion engine based on said output current acquired during a period in which said application voltage control for said air-fuel ratio detection is being performed;

perform, with said power supply circuit, application voltage control for SOx detection of performing at least one cycle of an application voltage sweep of: performing a voltage increase sweep of increasing said application voltage from a first voltage selected from a first voltage range more than a lower limit voltage in a region of said limiting current and less than a decomposition start voltage of said sulfur oxide to a second voltage selected from a second voltage range more than said decomposition start voltage of said sulfur oxide; and then performing a voltage decrease sweep of decreasing the application voltage from said second voltage to said first voltage, to thereby acquire, based on said output current, a parameter correlating with a degree of a change that is generated in said output current resulting from a current flowing between said first electrode and said second electrode due to a phenomenon that sulfur adsorbed to said first electrode returns to sulfur oxide through a reoxidation reaction on said first electrode when said application voltage becomes less than said decomposition start voltage of said sulfur oxide in a period of said voltage decrease sweep, and is generated in said output current that increases as said concentration of said sulfur oxide contained in said exhaust gas increases;

perform one of said determination of whether or not said sulfur oxide having a concentration equal to or more than said predetermined concentration is contained in said exhaust gas and said detection of said concentration of said sulfur oxide in said exhaust gas;

control, when said application voltage control for said air-fuel ratio detection is being performed, said amount of energization in accordance with a first temperature characteristic, which is a relationship between said impedance of said element part and said temperature of said element part in a case where said application voltage control for said air-fuel ratio detection is being performed, so that said temperature of said element part matches a first temperature; and control, when said application voltage control for said SOx detection is being performed, said amount of energization in accordance with a second temperature characteristic, which is a relationship between said impedance of said element part and said temperature of said element part in a case where said application voltage control for said SOx detection is being performed, so that said temperature of said element part matches a second temperature, which is one of a temperature equal to said first temperature and a temperature different from said first temperature, wherein the second temperature characteristic is different from the first temperature characteristic.

2. The gas detection device according to claim 1, wherein the instructions, when executed by the processor of the electronic control unit, cause the electronic control unit to:

control said amount of energization to said heater so that said detected impedance of said element part matches a target impedance;

set a first target impedance corresponding to said first temperature set in accordance with said first temperature characteristic as said target impedance when said application voltage control for said air-fuel ratio detection is being performed; and set a second target impedance corresponding to one of said first temperature and said second temperature set in accordance with said second temperature characteristic as said target impedance when said application voltage control for said SOx detection is being performed.

3. The gas detection device according to claim 2, wherein:

the instructions, when executed by the processor of the electronic control unit, cause the electronic control unit to:

detect said air-fuel ratio before performing said application voltage control for said SOx detection; and correct said relationship between said impedance of said element part and said temperature of said element part defined by said second temperature characteristic so as to be such a relationship that said impedance of said element part with respect to said temperature of said element part increases as said detected air-fuel ratio increases, and to define said second target impedance based on said corrected second temperature characteristic.

4. The gas detection device according to claim 2, wherein:

the instructions, when executed by the processor of the electronic control unit, cause the electronic control unit to:

detect said air-fuel ratio before performing said application voltage control for said SOx detection; and correct said second target impedance based on said detected air-fuel ratio, and to set said corrected second target impedance as said target impedance.

5. The gas detection device according to claim 1, wherein a voltage decrease speed of said voltage decrease sweep is set so as to be a speed at which a speed of said reoxidation reaction quickly increases after a time point at which said application voltage becomes a voltage in said first voltage range and in a voltage range more than said first voltage.

* * * * *